US009513472B2

(12) United States Patent
Bito et al.

(10) Patent No.: US 9,513,472 B2
(45) Date of Patent: Dec. 6, 2016

(54) ZOOM LENS SYSTEM, IMAGING DEVICE AND CAMERA

(71) Applicant: Panasonic Intellectual Property Management Co., Ltd., Osaka (JP)

(72) Inventors: Takakazu Bito, Osaka (JP); Hiroaki Suzuki, Osaka (JP); Yoshiaki Kurioka, Osaka (JP); Yusuke Yonetani, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 56 days.

(21) Appl. No.: 14/573,406

(22) Filed: Dec. 17, 2014

(65) Prior Publication Data
US 2015/0103211 A1 Apr. 16, 2015

Related U.S. Application Data

(63) Continuation of application No. PCT/JP2012/004318, filed on Jul. 4, 2012.

(51) Int. Cl.
*G02B 9/62* (2006.01)
*G02B 15/16* (2006.01)
*G02B 15/20* (2006.01)
*G02B 15/173* (2006.01)
*G02B 15/22* (2006.01)
(Continued)

(52) U.S. Cl.
CPC ............. *G02B 15/16* (2013.01); *G02B 15/173* (2013.01); *G02B 15/20* (2013.01); *G02B 15/22* (2013.01); *H04N 5/2254* (2013.01); *H04N 5/23212* (2013.01); *H04N 5/23296* (2013.01); *G02B 13/009* (2013.01); *G02B 27/4211* (2013.01)

(58) Field of Classification Search
CPC ....... G02B 15/16; G02B 15/22; G02B 15/173; G02B 15/20; G02B 13/009; G02B 27/4211
See application file for complete search history.

(56) References Cited

U.S. PATENT DOCUMENTS 5,189,557 A 2/1993 Endo
5,691,851 A 11/1997 Nishio et al.
(Continued)

FOREIGN PATENT DOCUMENTS

JP 04-186211 7/1992
JP 7-77656 3/1995
(Continued)

*Primary Examiner* — Joseph P Martinez
(74) *Attorney, Agent, or Firm* — Wenderoth, Lind & Ponack, L.L.P.

(57) ABSTRACT

A zoom lens system, in order from an object side to an image side, comprising: a first lens unit having positive optical power; a second lens unit having negative optical power; a third lens unit having positive optical power; a fourth lens unit having negative optical power; a fifth lens unit; and a sixth lens unit, wherein in zooming from a wide-angle limit to a telephoto limit at a time of image taking, the first lens unit, the second lens unit, the third lens unit, and the fourth lens unit move along an optical axis so that an interval between the third lens unit and the fourth lens unit at the telephoto limit is larger than that at the wide-angle limit, and wherein focusing from an infinity in-focus condition to a close-object in-focus condition is performed by moving the fourth lens unit along the optical axis.

16 Claims, 16 Drawing Sheets

(51) Int. Cl.
*H04N 5/232* (2006.01)
*H04N 5/225* (2006.01)
*G02B 27/42* (2006.01)
*G02B 13/00* (2006.01)

(56) References Cited

U.S. PATENT DOCUMENTS

| | | |
|---|---|---|
| 2001/0046383 A1 | 11/2001 | Hagimori et al. |
| 2008/0218875 A1 | 9/2008 | Kuroda et al. |
| 2010/0033836 A1 | 2/2010 | Ohtake |
| 2011/0026134 A1 | 2/2011 | Sakai |
| 2011/0080653 A1 | 4/2011 | Kimura |
| 2011/0102905 A1 | 5/2011 | Harada |
| 2011/0141577 A1* | 6/2011 | Kimura ............... G02B 15/173 359/683 |
| 2011/0273776 A1 | 11/2011 | Obama et al. |
| 2012/0188647 A1 | 7/2012 | Tanaka et al. |
| 2012/0287312 A1 | 11/2012 | Kimura |

FOREIGN PATENT DOCUMENTS

| | | |
|---|---|---|
| JP | 2001-350093 | 12/2001 |
| JP | 2006-251462 | 9/2006 |
| JP | 2010-039271 | 2/2010 |
| JP | 2010-271362 | 12/2010 |
| JP | 2011-033867 | 2/2011 |
| JP | 2011-81113 | 4/2011 |
| JP | 2011-090190 | 5/2011 |
| JP | 2011-099925 | 5/2011 |
| JP | 2011-123337 | 6/2011 |
| JP | 2011-186159 | 9/2011 |
| JP | 2011-186161 | 9/2011 |
| JP | 2011-209347 | 10/2011 |
| JP | 2012-155087 | 8/2012 |
| JP | 2013-11819 | 1/2013 |

* cited by examiner

ZOOM LENS SYSTEM, IMAGING DEVICE AND CAMERA

RELATED APPLICATIONS

This application is a Continuation of International Application No. PCT/JP2012/004318, filed on Jul. 4, 2012, the disclosure of which Application is incorporated by reference herein.

BACKGROUND

1. Field

The present disclosure relates to zoom lens systems, imaging devices, and cameras.

2. Description of the Related Art

Size reduction and performance improvement are strongly required of cameras having image sensors performing photoelectric conversion, such as digital still cameras and digital video cameras (simply referred to as digital cameras, hereinafter).

Japanese Laid-Open Patent Publications Nos. 2011-209347, 2011-123337, 2011-090190, and 2010-039271 each disclose a lens system of a six-unit configuration including a first lens unit having positive optical power, a second lens unit having negative optical power, and a third lens unit having positive optical power, in which the first to third lens units move in zooming.

Japanese Laid-Open Patent Publication No. 2006-251462 discloses a lens system of a six-unit configuration including a first lens unit having positive optical power, a second lens unit having negative optical power, a third lens unit having positive optical power, a fourth lens unit having negative optical power, a fifth lens unit having positive optical power, and a sixth lens unit having negative optical power, in which the intervals between these lens units are varied to perform magnification change, and the fourth lens unit is moved along an optical axis to perform focusing.

SUMMARY

The present disclosure provides a zoom lens system having sufficient brightness and high resolution even at a telephoto limit, while achieving a small size and high magnification. Further, the present disclosure provides an imaging device including the zoom lens system, and a camera including the imaging device.

(I) The novel concepts disclosed herein were achieved in order to solve the foregoing problems in the related art, and herein is disclosed:

a zoom lens system, in order from an object side to an image side, comprising:
 a first lens unit having positive optical power;
 a second lens unit having negative optical power;
 a third lens unit having positive optical power;
 a fourth lens unit having negative optical power;
 a fifth lens unit; and
 a sixth lens unit, wherein
 in zooming from a wide-angle limit to a telephoto limit at a time of image taking, the first lens unit, the second lens unit, the third lens unit, and the fourth lens unit move along an optical axis so that an interval between the third lens unit and the fourth lens unit at the telephoto limit is larger than that at the wide-angle limit, and wherein
 focusing from an infinity in-focus condition to a close-object in-focus condition is performed by moving the fourth lens unit along the optical axis.

The novel concepts disclosed herein were achieved in order to solve the foregoing problems in the related art, and herein is disclosed:

an imaging device capable of outputting an optical image of an object as an electric image signal, comprising:
 a zoom lens system that forms the optical image of the object; and
 an image sensor that converts the optical image formed by the zoom lens system into the electric image signal, wherein
 the zoom lens system, in order from an object side to an image side, comprises:
 a first lens unit having positive optical power;
 a second lens unit having negative optical power;
 a third lens unit having positive optical power;
 a fourth lens unit having negative optical power;
 a fifth lens unit; and
 a sixth lens unit, wherein
 in zooming from a wide-angle limit to a telephoto limit at a time of image taking, the first lens unit, the second lens unit, the third lens unit, and the fourth lens unit move along an optical axis so that an interval between the third lens unit and the fourth lens unit at the telephoto limit is larger than that at the wide-angle limit, and wherein
 focusing from an infinity in-focus condition to a close-object in-focus condition is performed by moving the fourth lens unit along the optical axis.

The novel concepts disclosed herein were achieved in order to solve the foregoing problems in the related art, and herein is disclosed:

a camera for converting an optical image of an object into an electric image signal and then performing at least one of displaying and storing of the converted image signal, comprising:
 an imaging device including a zoom lens system that forms the optical image of the object, and an image sensor that converts the optical image formed by the zoom lens system into the electric image signal, wherein
 the zoom lens system, in order from an object side to an image side, comprises:
 a first lens unit having positive optical power;
 a second lens unit having negative optical power;
 a third lens unit having positive optical power;
 a fourth lens unit having negative optical power;
 a fifth lens unit; and
 a sixth lens unit, wherein
 in zooming from a wide-angle limit to a telephoto limit at a time of image taking, the first lens unit, the second lens unit, the third lens unit, and the fourth lens unit move along an optical axis so that an interval between the third lens unit and the fourth lens unit at the telephoto limit is larger than that at the wide-angle limit, and wherein
 focusing from an infinity in-focus condition to a close-object in-focus condition is performed by moving the fourth lens unit along the optical axis.

(II) The novel concepts disclosed herein were achieved in order to solve the foregoing problems in the related art, and herein is disclosed:

a zoom lens system, in order from an object side to an image side, comprising:
 at least
 a first lens unit having positive optical power;
 a second lens unit having negative optical power; and
 a third lens unit having positive optical power, wherein
 in zooming from a wide-angle limit to a telephoto limit at a time of image taking, the first lens unit, the second lens unit, and the third lens unit move along an optical axis, and wherein the following conditions (2), (3) and (4) are satisfied:

$$0.7 < L_T/f_T < 1.5 \quad (2)$$

$$f_T/f_W > 12.0 \quad (3)$$

$$F_T/F_W < 1.4 \quad (4)$$

where $L_T$ is an overall length of the zoom lens system at the telephoto limit, being a distance from a most object side surface of the first lens unit to an image surface, $f_T$ is a focal length of the zoom lens system at the telephoto limit, $f_W$ is a focal length of the zoom lens system at the wide-angle limit, $F_T$ is an F-number at the telephoto limit, and $F_W$ is an F-number at the wide-angle limit.

The novel concepts disclosed herein were achieved in order to solve the foregoing problems in the related art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein the zoom lens system, in order from an object side to an image side, comprises:

at least a first lens unit having positive optical power;

a second lens unit having negative optical power; and a third lens unit having positive optical power, wherein in zooming from a wide-angle limit to a telephoto limit at a time of image taking, the first lens unit, the second lens unit, and the third lens unit move along an optical axis, and wherein the following conditions (2), (3) and (4) are satisfied:

$$0.7 < L_T/f_T < 1.5 \quad (2)$$

$$f_T/f_W > 12.0 \quad (3)$$

$$F_T/F_W < 1.4 \quad (4)$$

where $L_T$ is an overall length of the zoom lens system at the telephoto limit, being a distance from a most object side surface of the first lens unit to an image surface, $f_T$ is a focal length of the zoom lens system at the telephoto limit, $f_W$ is a focal length of the zoom lens system at the wide-angle limit, $F_T$ is an F-number at the telephoto limit, and $F_W$ is an F-number at the wide-angle limit.

The novel concepts disclosed herein were achieved in order to solve the foregoing problems in the related art, and herein is disclosed:

a camera for converting an optical image of an object into an electric image signal and then performing at least one of displaying and storing of the converted image signal, comprising:

an imaging device including a zoom lens system that forms the optical image of the object, and an image sensor that converts the optical image formed by the zoom lens system into the electric image signal, wherein the zoom lens system, in order from an object side to an image side, comprises:

at least a first lens unit having positive optical power;

a second lens unit having negative optical power; and a third lens unit having positive optical power, wherein in zooming from a wide-angle limit to a telephoto limit at a time of image taking, the first lens unit, the second lens unit, and the third lens unit move along an optical axis, and wherein the following conditions (2), (3) and (4) are satisfied:

$$0.7 < L_T/f_T < 1.5 \quad (2)$$

$$f_T/f_W > 12.0 \quad (3)$$

$$F_T/F_W < 1.4 \quad (4)$$

where $L_T$ is an overall length of the zoom lens system at the telephoto limit, being a distance from a most object side surface of the first lens unit to an image surface, $f_T$ is a focal length of the zoom lens system at the telephoto limit, $f_W$ is a focal length of the zoom lens system at the wide-angle limit, $F_T$ is an F-number at the telephoto limit, and $F_W$ is an F-number at the wide-angle limit.

The zoom lens system according to the present disclosure has sufficient brightness and high resolution even at a telephoto limit, while achieving a small size and high magnification.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
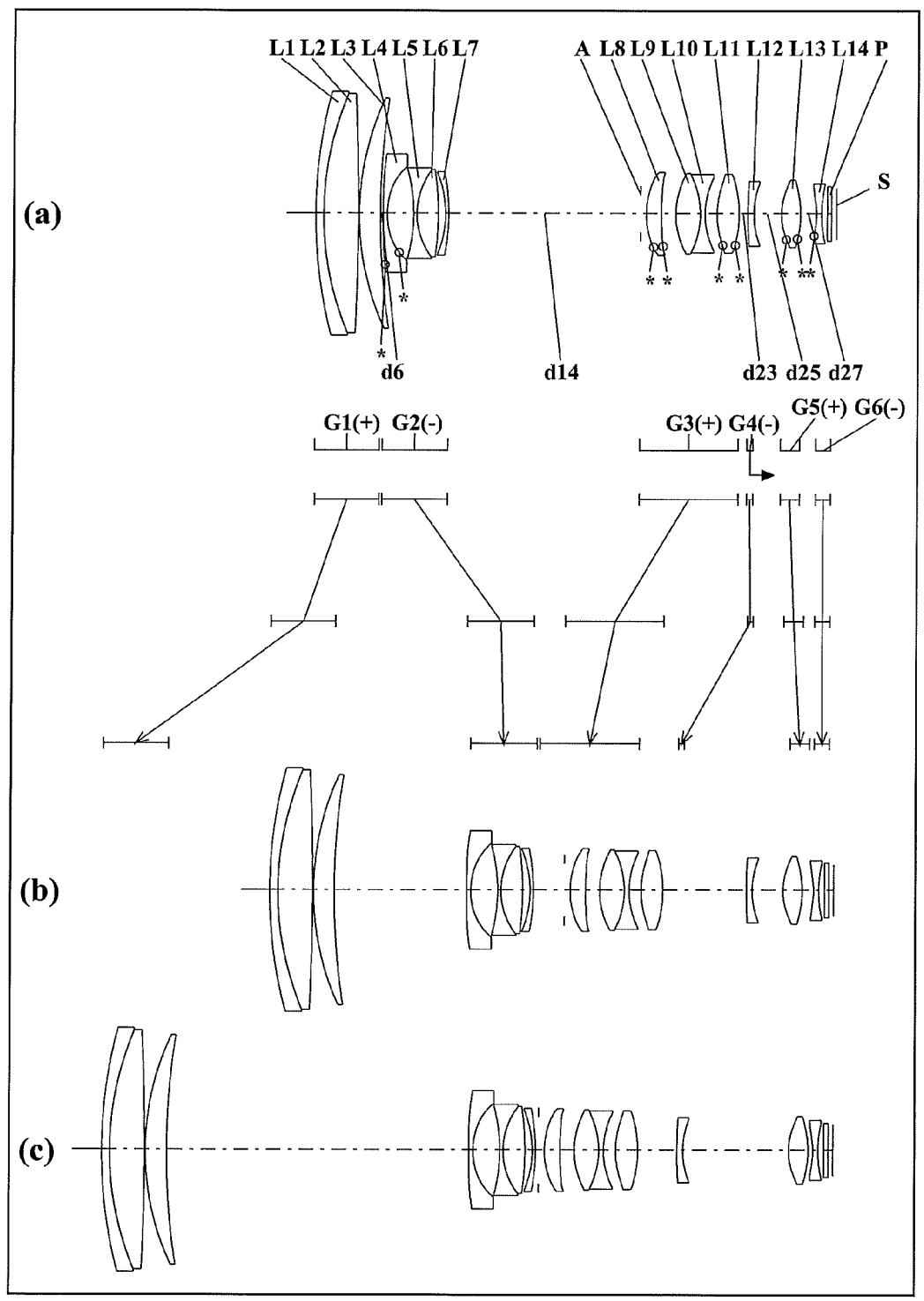
FIG. 1 is a lens arrangement diagram showing an infinity in-focus condition of a zoom lens system according to Embodiment 1 (Numerical Example 1)
Figure 2:
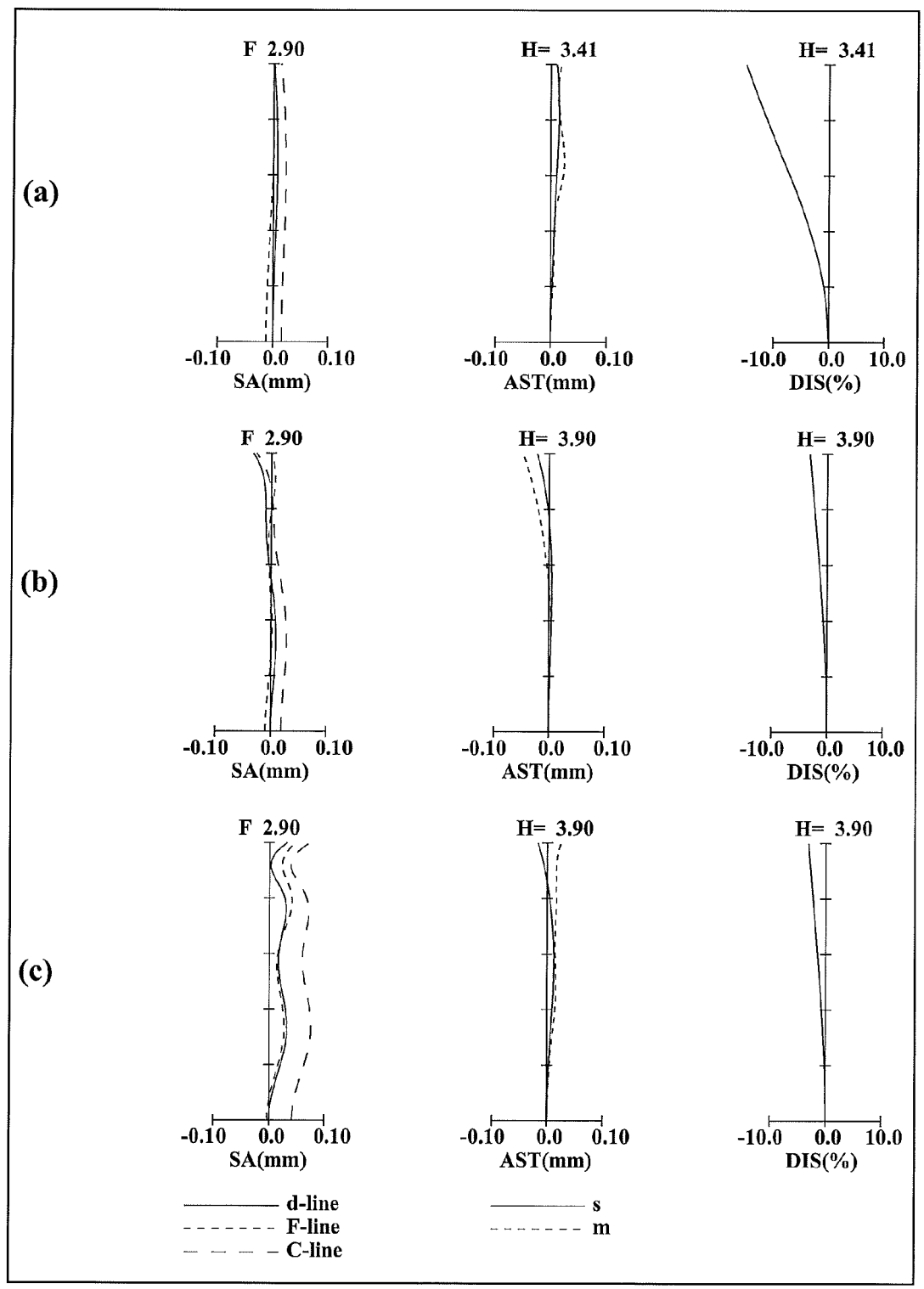
FIG. 2 is a longitudinal aberration diagram showing an infinity in-focus condition of the zoom lens system according to Numerical Example 1.
Figure 3:
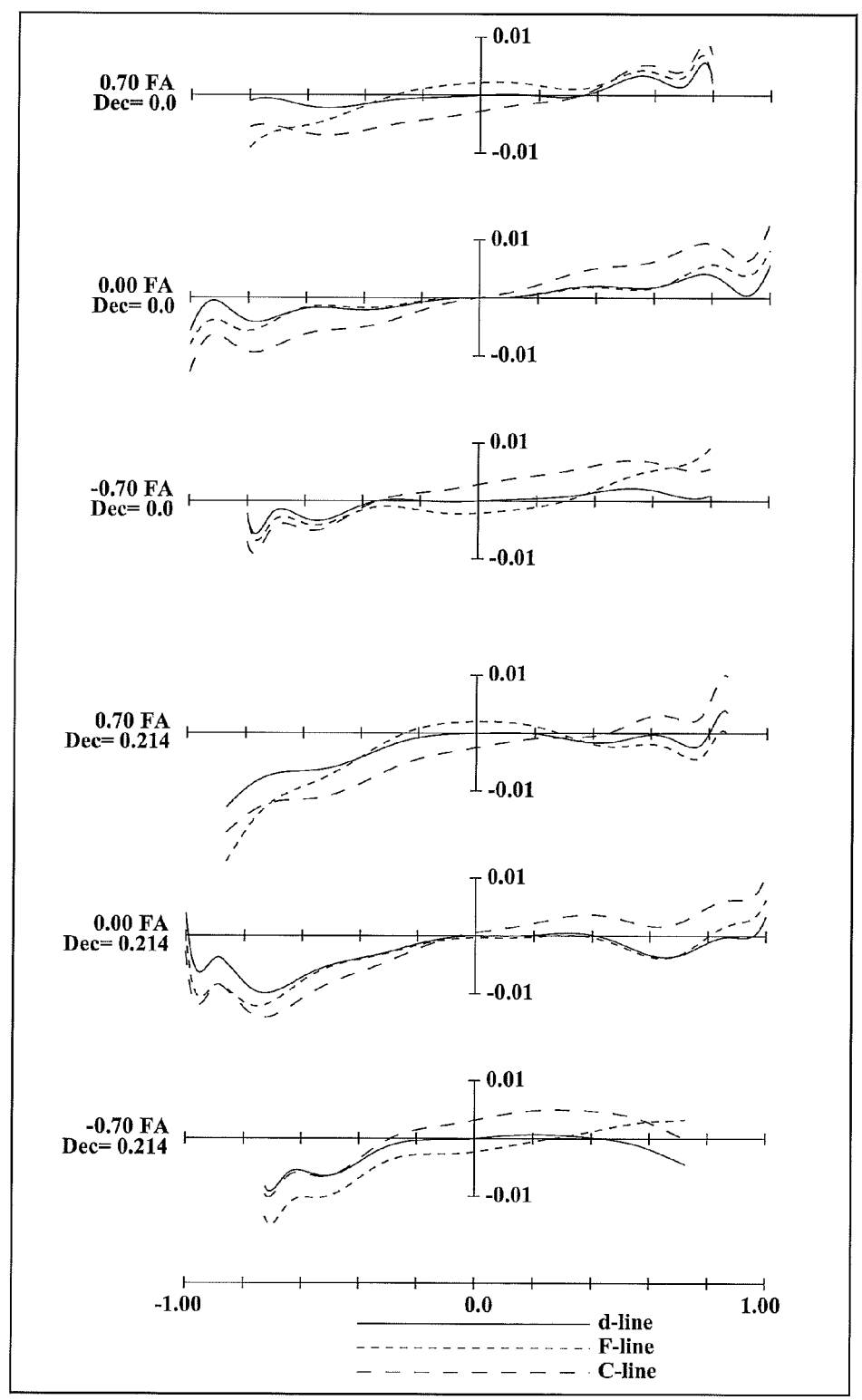
FIG. 3 is a lateral aberration diagram in a basic state where image blur compensation is not performed and in an image blur compensation state at a telephoto limit of the zoom lens system according to Numerical Example 1.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 5

FIGS. 1, 4, 7, 10 and 13 are lens arrangement diagrams of zoom lens systems according to Embodiments 1 to 5, respectively. Each zoom lens system is in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit.

In each Fig., an arrow imparted to a lens unit indicates focusing from an infinity in-focus condition to a close-object in-focus condition. That is, in FIGS. 1, 4, 7, 10 and 13, the arrow indicates a direction along which a fourth lens unit G4 described later moves in focusing from an infinity in-focus condition to a close-object in-focus condition.

Each of the zoom lens systems according to the embodiments, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having positive optical power, and a sixth lens unit G6 having negative optical power. An aperture diaphragm A is provided on the object side relative to the third lens unit G3.

In zooming, the first to fifth lens units G1 to G5 individually move along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6, vary. In the zoom lens system according to each embodiment, these lens units are arranged in a desired optical power allocation, whereby size reduction of the entire lens system is achieved while maintaining high optical performance.

In FIGS. 1, 4, 7, 10 and 13, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (between the image surface S and the most image side lens surface of the sixth lens unit G6), a plane parallel plate P equivalent to an optical low-pass filter or a face plate of an image sensor is provided.

Embodiment 1

As shown in FIG. 1, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. Among these, the fifth lens element L5 and the sixth lens element L6 are cemented with each other. In the surface data of the corresponding Numerical Example described later, a surface number 10 is imparted to an adhesive layer between the fifth lens element L5 and the sixth lens element L6. The fourth lens element L4 has two aspheric surfaces.

The third lens unit G3, in order from the object side to the image side, comprises: a positive meniscus eighth lens element L8 with the convex surface facing the object side; a bi-convex ninth lens element L9; a bi-concave tenth lens element L10; and a bi-convex eleventh lens element L11. Among these, the ninth lens element L9 and the tenth lens element L10 are cemented with each other. In the surface data of the corresponding Numerical Example described later, a surface number 19 is imparted to an adhesive layer between the ninth lens element L9 and the tenth lens element L10. The eighth lens element L8 has two aspheric surfaces, and the eleventh lens element L11 has two aspheric surfaces.

The fourth lens unit G4 comprises solely a negative meniscus twelfth lens element L12 with the convex surface facing the object side.

The fifth lens unit G5 comprises solely a bi-convex thirteenth lens element L13. The thirteenth lens element L13 has two aspheric surfaces.

The sixth lens unit G6 comprises solely a bi-concave fourteenth lens element L14. The fourteenth lens element L14 has an aspheric object side surface.

In the zoom lens system according to Embodiment 1, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 moves to the object side with locus of a convex to the object side, the fourth lens unit G4 moves to the object side with locus of a convex to the image side, the fifth lens unit G5 substantially monotonically moves to the image side, and the sixth lens unit G6 is fixed with respect to the image surface S. That is, in zooming, the first to fifth lens units G1 to G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 at the telephoto limit is larger than that at the wide-angle limit, the interval between the fourth lens unit G4 and the fifth lens unit G5 changes, and the interval between the fifth lens unit G5 and the sixth lens unit G6 decreases.

In the zoom lens system according to Embodiment 1, in focusing from an infinity in-focus condition to a close-object in-focus condition, the fourth lens unit G4 moves to the image side along the optical axis.

Embodiment 2

Figure 4:
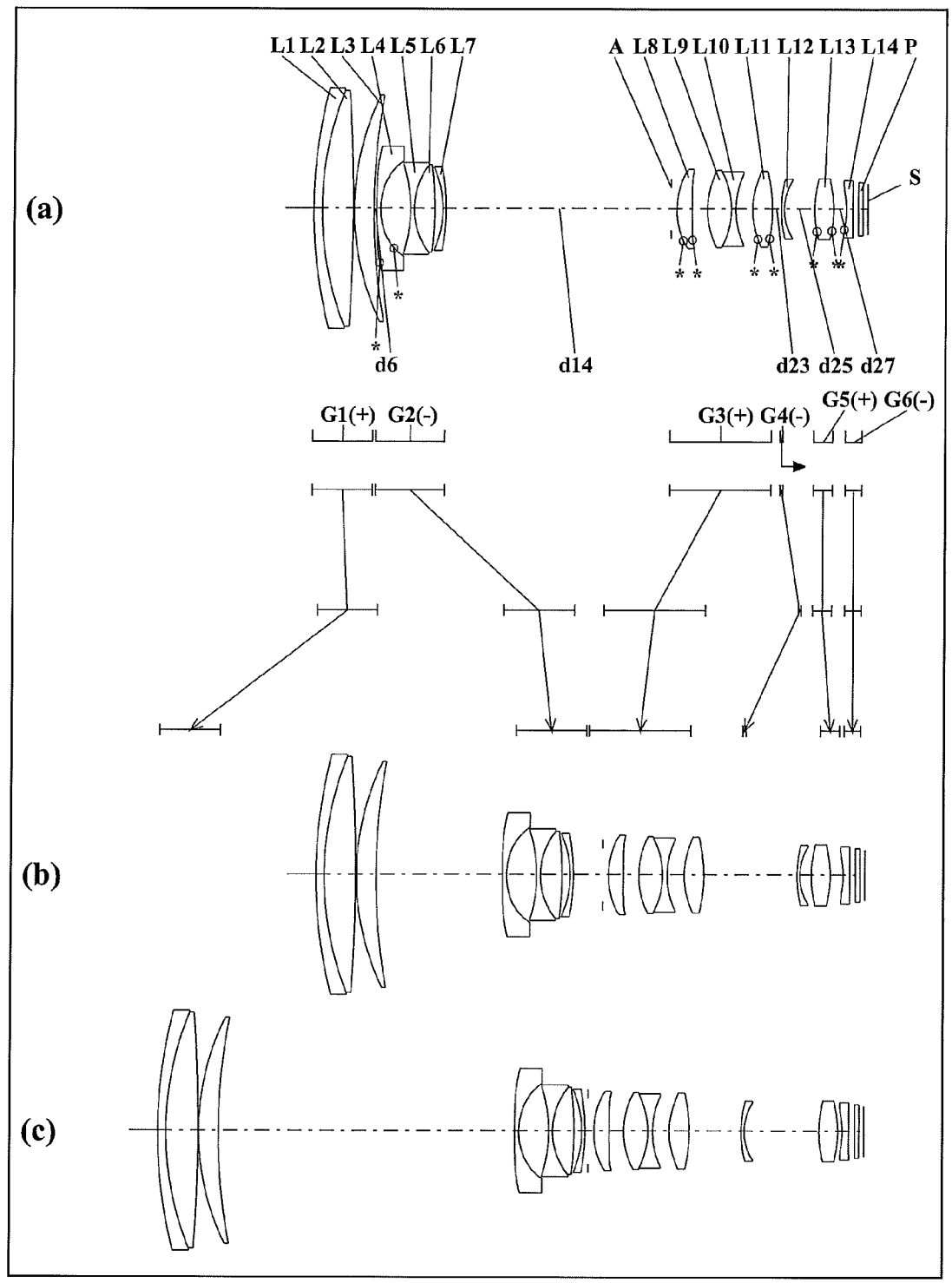
FIG. 4 is a lens arrangement diagram showing an infinity in-focus condition of a zoom lens system according to Embodiment 2 (Numerical Example 2)
Figure 5:
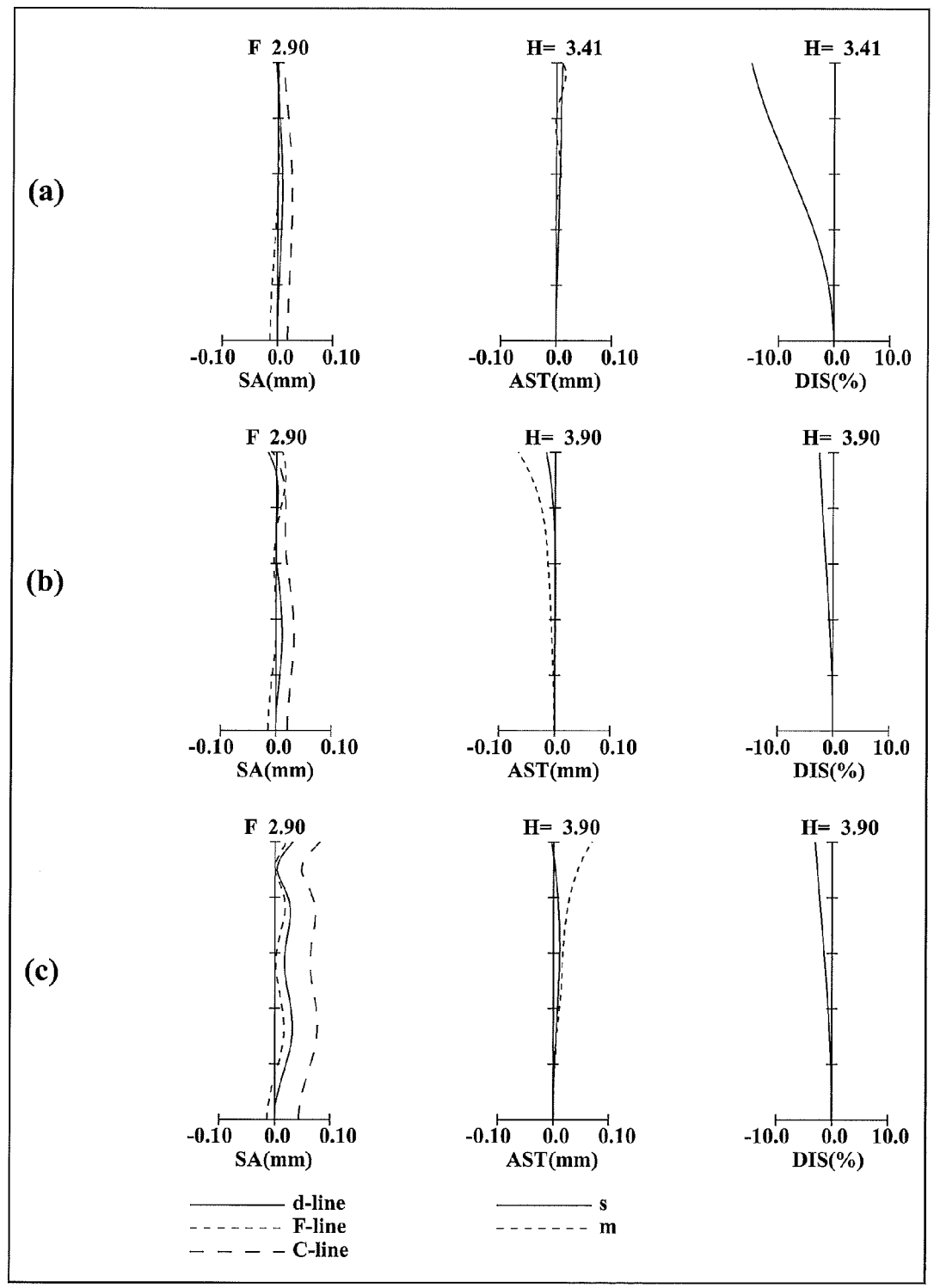
FIG. 5 is a longitudinal aberration diagram showing an infinity in-focus condition of the zoom lens system according to Numerical Example 2.
Figure 6:
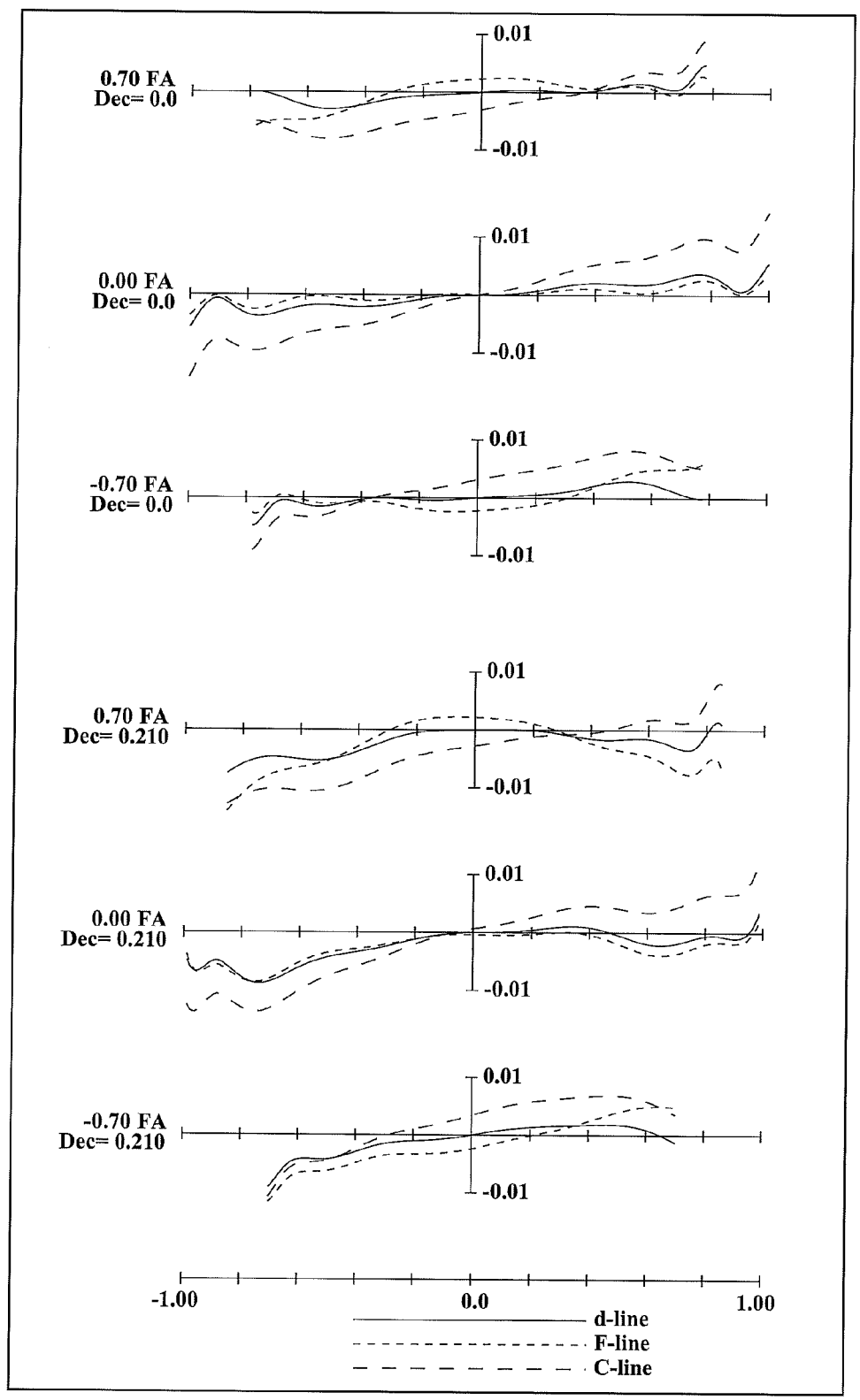
FIG. 6 is a lateral aberration diagram in a basic state where image blur compensation is not performed and in an image blur compensation state at a telephoto limit of the zoom lens system according to Numerical Example 2.

As shown in FIG. 4, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. Among these, the fifth lens element L5 and the sixth lens element L6 are cemented with each other. In the surface data of the corresponding Numerical Example described later, a surface number 10 is imparted to an adhesive layer between the fifth lens element L5 and the sixth lens element L6. The fourth lens element L4 has two aspheric surfaces.

The third lens unit G3, in order from the object side to the image side, comprises: a positive meniscus eighth lens element L8 with the convex surface facing the object side; a bi-convex ninth lens element L9; a bi-concave tenth lens element L10; and a bi-convex eleventh lens element L11. Among these, the ninth lens element L9 and the tenth lens element L10 are cemented with each other. In the surface data of the corresponding Numerical Example described later, a surface number 19 is imparted to an adhesive layer between the ninth lens element L9 and the tenth lens element L10. The eighth lens element L8 has two aspheric surfaces, and the eleventh lens element L11 has two aspheric surfaces.

The fourth lens unit G4 comprises solely a negative meniscus twelfth lens element L12 with the convex surface facing the object side.

The fifth lens unit G5 comprises solely a bi-convex thirteenth lens element L13. The thirteenth lens element L13 has two aspheric surfaces.

The sixth lens unit G6 comprises solely a bi-concave fourteenth lens element L14. The fourteenth lens element L14 has an aspheric object side surface.

In the zoom lens system according to Embodiment 2, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 moves to the object side with locus of a convex to the object side, the fourth lens unit G4 moves to the object side with locus of a convex to the image side, the fifth lens unit G5 substantially monotonically moves to the image side, and the sixth lens unit G6 is fixed with respect to the image surface S. That is, in zooming, the first to fifth lens units G1 to G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 at the telephoto limit is larger than that at the wide-angle limit, the interval between the fourth lens unit G4 and the fifth lens unit G5 changes, and the interval between the fifth lens unit G5 and the sixth lens unit G6 decreases.

In the zoom lens system according to Embodiment 2, in focusing from an infinity in-focus condition to a close-object in-focus condition, the fourth lens unit G4 moves to the image side along the optical axis.

Embodiment 3

Figure 7:
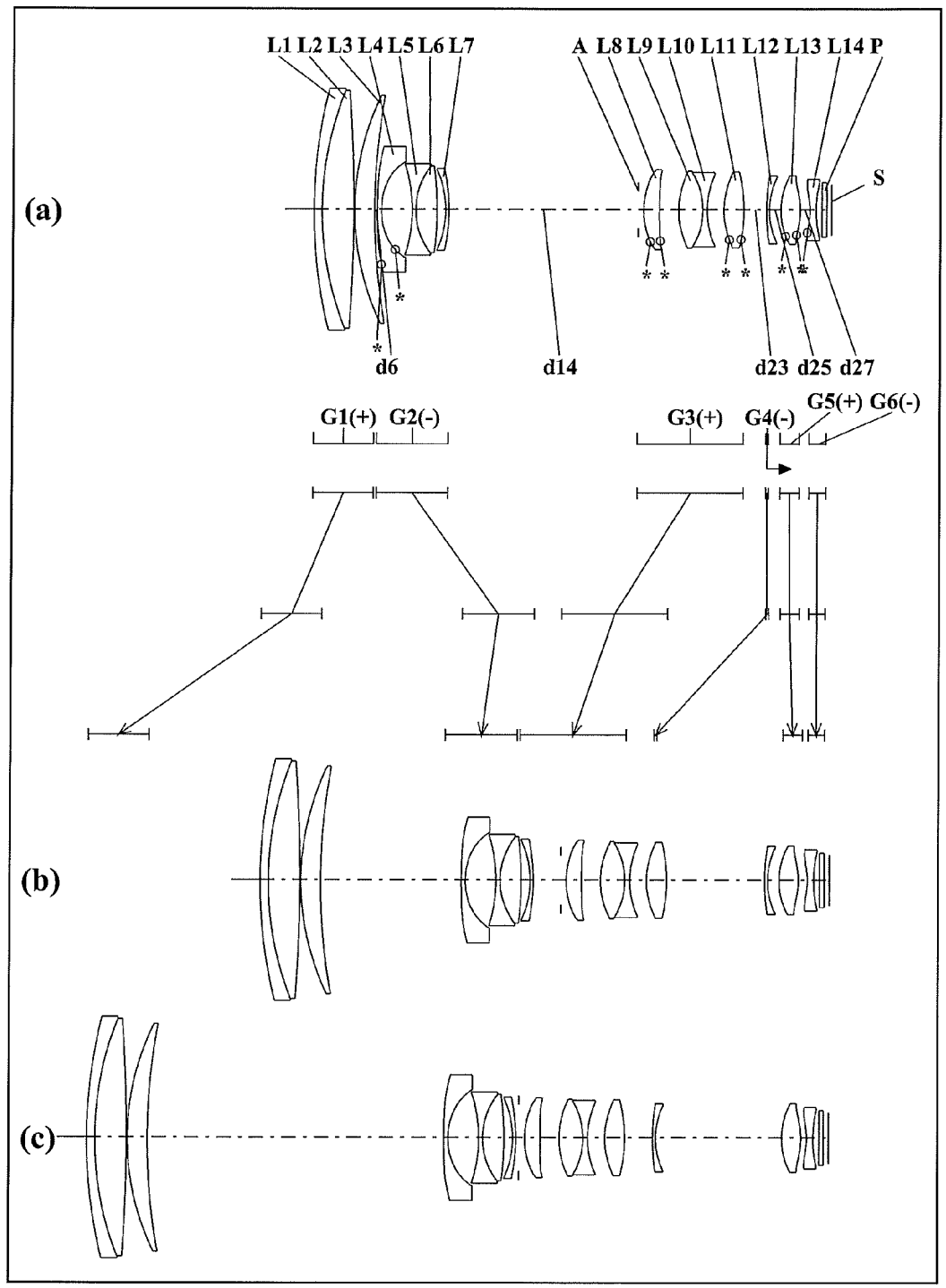
FIG. 7 is a lens arrangement diagram showing an infinity in-focus condition of a zoom lens system according to Embodiment 3 (Numerical Example 3)
Figure 8:
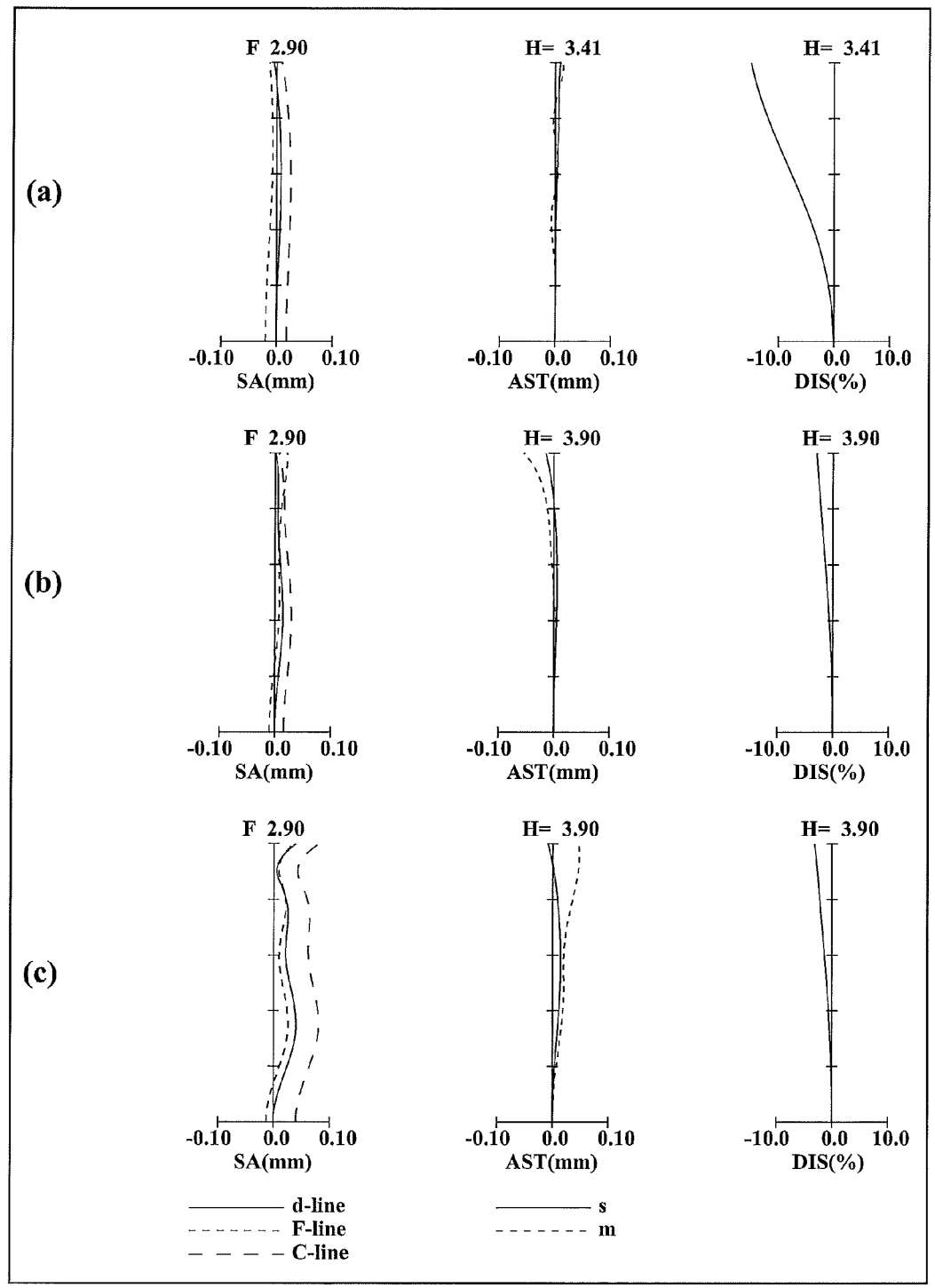
FIG. 8 is a longitudinal aberration diagram showing an infinity in-focus condition of the zoom lens system according to Numerical Example 3.
Figure 9:
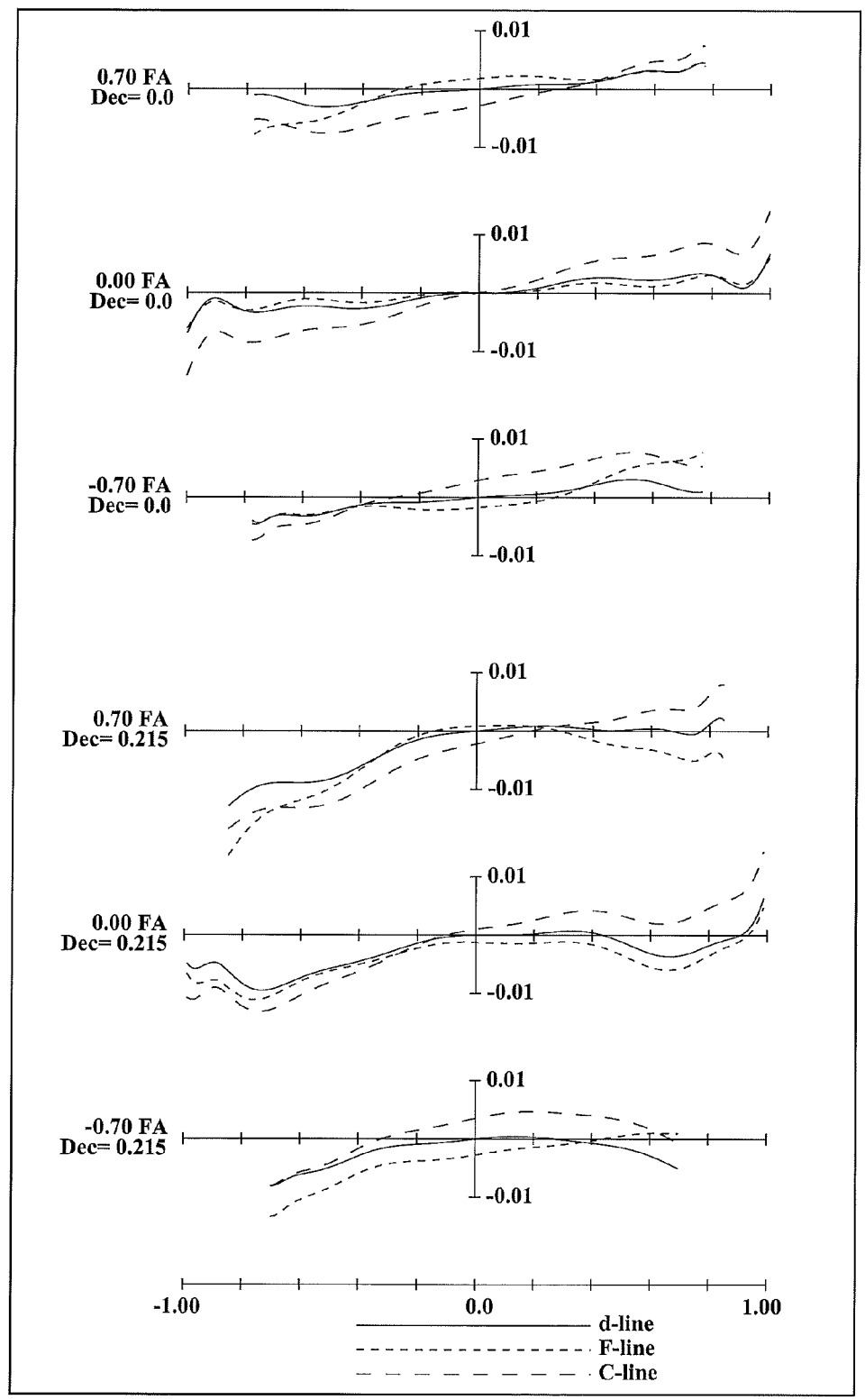
FIG. 9 is a lateral aberration diagram in a basic state where image blur compensation is not performed and in an image blur compensation state at a telephoto limit of the zoom lens system according to Numerical Example 3.

As shown in FIG. 7, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. Among these, the fifth lens element L5 and the sixth lens element L6 are cemented with each other. In the surface data of the corresponding Numerical Example described later, a surface number 10 is imparted to an adhesive layer between the fifth lens element L5 and the sixth lens element L6. The fourth lens element L4 has two aspheric surfaces.

The third lens unit G3, in order from the object side to the image side, comprises: a positive meniscus eighth lens element L8 with the convex surface facing the object side; a bi-convex ninth lens element L9; a bi-concave tenth lens element L10; and a bi-convex eleventh lens element L11. Among these, the ninth lens element L9 and the tenth lens element L10 are cemented with each other. In the surface data of the corresponding Numerical Example described later, a surface number 19 is imparted to an adhesive layer between the ninth lens element L9 and the tenth lens element L10. The eighth lens element L8 has two aspheric surfaces, and the eleventh lens element L11 has two aspheric surfaces.

The fourth lens unit G4 comprises solely a negative meniscus twelfth lens element L12 with the convex surface facing the object side.

The fifth lens unit G5 comprises solely a bi-convex thirteenth lens element L13. The thirteenth lens element L13 has two aspheric surfaces.

The sixth lens unit G6 comprises solely a bi-concave fourteenth lens element L14. The fourteenth lens element L14 has an aspheric object side surface.

In the zoom lens system according to Embodiment 3, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 moves to the object side with locus of a convex to the object side, the fourth lens unit G4 moves to the object side with locus of a convex to the image side, the fifth lens unit G5 substantially monotonically moves to the image side, and the sixth lens unit G6 is fixed with respect to the image surface S. That is, in zooming, the first to fifth lens units G1 to G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 at the telephoto limit is larger than that at the wide-angle limit, the interval between the fourth lens unit G4 and the fifth lens unit G5 changes, and the interval between the fifth lens unit G5 and the sixth lens unit G6 decreases.

In the zoom lens system according to Embodiment 3, in focusing from an infinity in-focus condition to a close-object in-focus condition, the fourth lens unit G4 moves to the image side along the optical axis.

Embodiment 4

Figure 10:
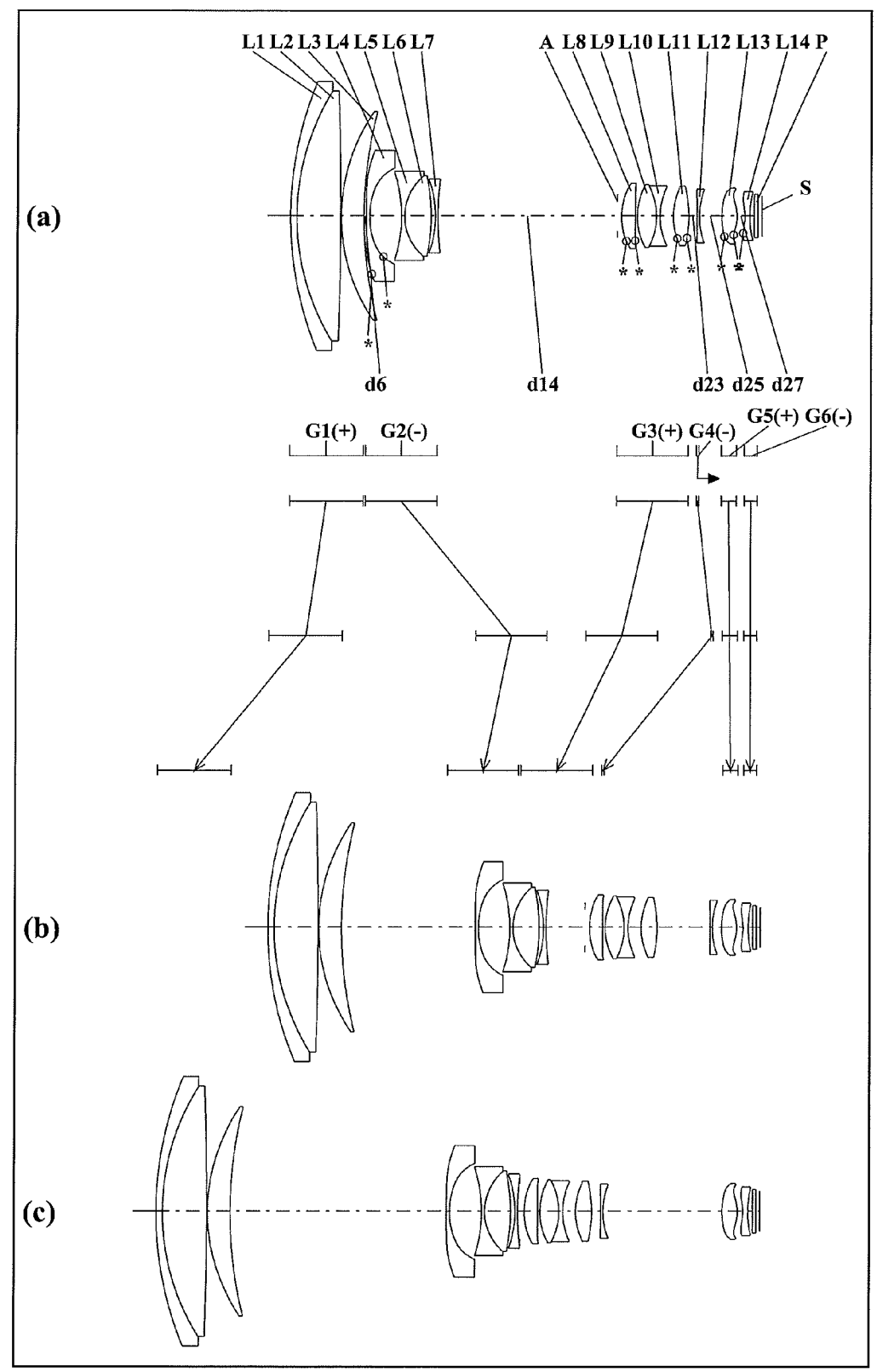
FIG. 10 is a lens arrangement diagram showing an infinity in-focus condition of a zoom lens system according to Embodiment 4 (Numerical Example 4)
Figure 11:
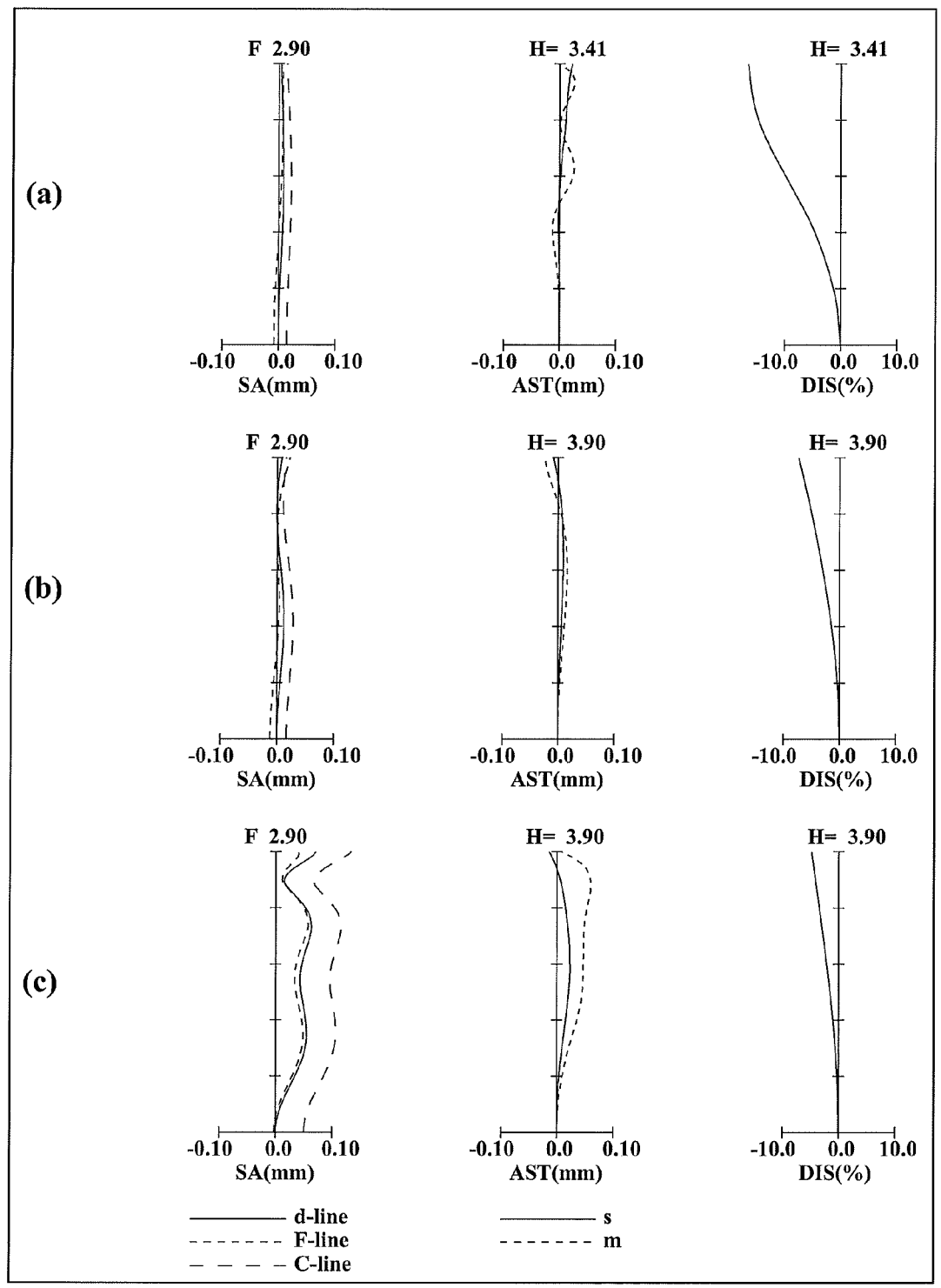
FIG. 11 is a longitudinal aberration diagram showing an infinity in-focus condition of the zoom lens system according to Numerical Example 4.
Figure 12:
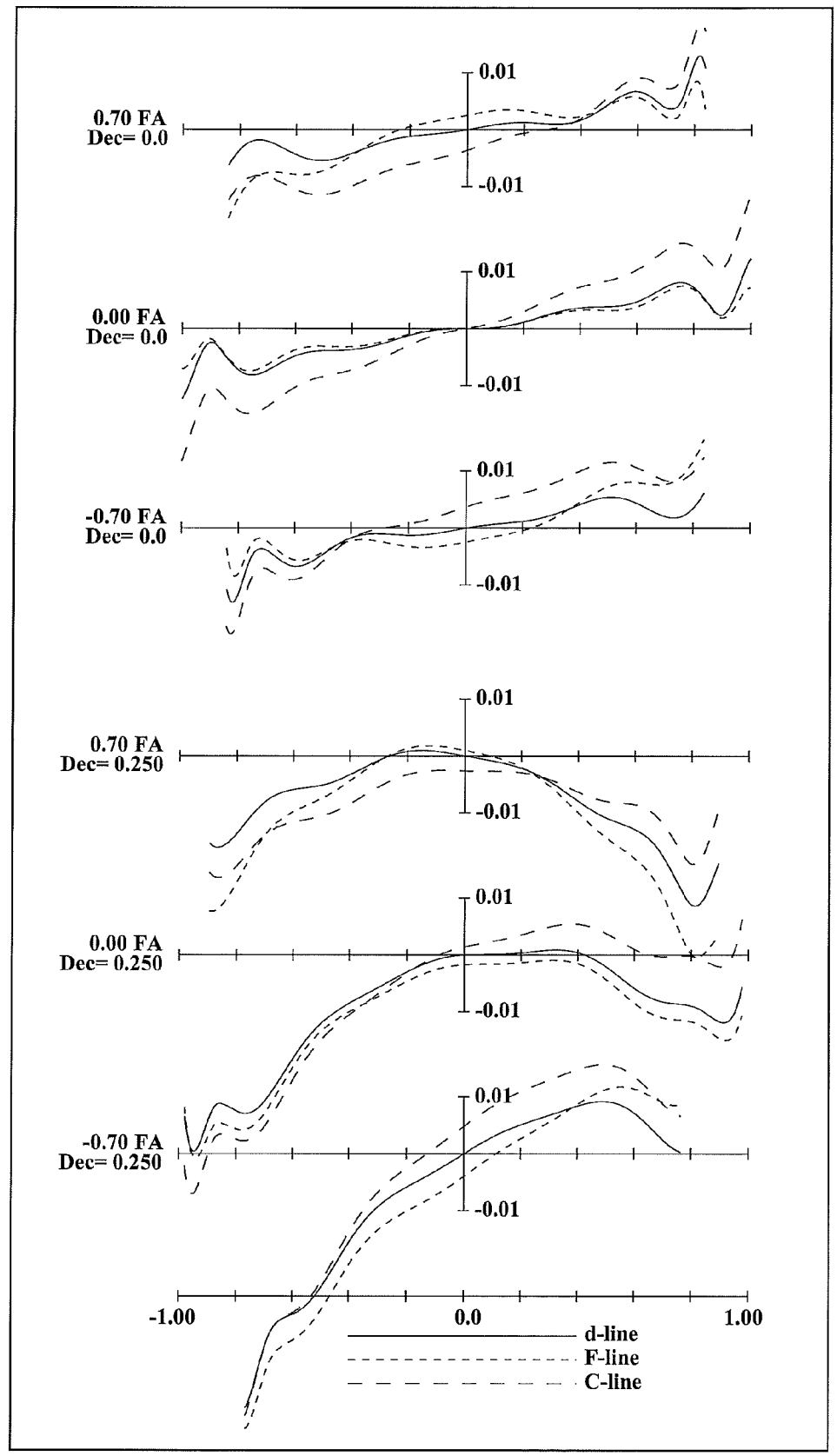
FIG. 12 is a lateral aberration diagram in a basic state where image blur compensation is not performed and in an image blur compensation state at a telephoto limit of the zoom lens system according to Numerical Example 4.

As shown in FIG. 10, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; a bi-convex sixth lens element L6; and a bi-concave seventh lens element L7. Among these, the fifth lens element L5 and the sixth lens element L6 are cemented with each other. In the surface data of the corresponding Numerical Example described later, a surface number 10 is imparted to an adhesive layer between the fifth lens element L5 and the sixth lens element L6. The fourth lens element L4 has two aspheric surfaces.

The third lens unit G3, in order from the object side to the image side, comprises: a bi-convex eighth lens element L8; a bi-convex ninth lens element L9; a bi-concave tenth lens element L10; and a bi-convex eleventh lens element L11. Among these, the ninth lens element L9 and the tenth lens element L10 are cemented with each other. In the surface data of the corresponding Numerical Example described later, a surface number 19 is imparted to an adhesive layer between the ninth lens element L9 and the tenth lens element L10. The eighth lens element L8 has two aspheric surfaces, and the eleventh lens element L11 has two aspheric surfaces.

The fourth lens unit G4 comprises solely a bi-concave twelfth lens element L12.

The fifth lens unit G5 comprises solely a bi-convex thirteenth lens element L13. The thirteenth lens element L13 has two aspheric surfaces.

The sixth lens unit G6 comprises solely a bi-concave fourteenth lens element L14. The fourteenth lens element L14 has an aspheric object side surface.

In the zoom lens system according to Embodiment 4, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 moves to the object side with locus of a convex to the image side, the fourth lens unit G4 moves to the object side with locus of a convex to the image side, the fifth lens unit G5 substantially monotonically moves to the image side, and the sixth lens unit G6 is fixed with respect to the image surface S. That is, in zooming, the first to fifth lens units G1 to G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 at the telephoto limit is larger than that at the wide-angle limit, the interval between the fourth lens unit G4 and the fifth lens unit G5 changes, and the interval between the fifth lens unit G5 and the sixth lens unit G6 decreases.

In the zoom lens system according to Embodiment 4, in focusing from an infinity in-focus condition to a close-object in-focus condition, the fourth lens unit G4 moves to the image side along the optical axis.

Embodiment 5

Figure 13:
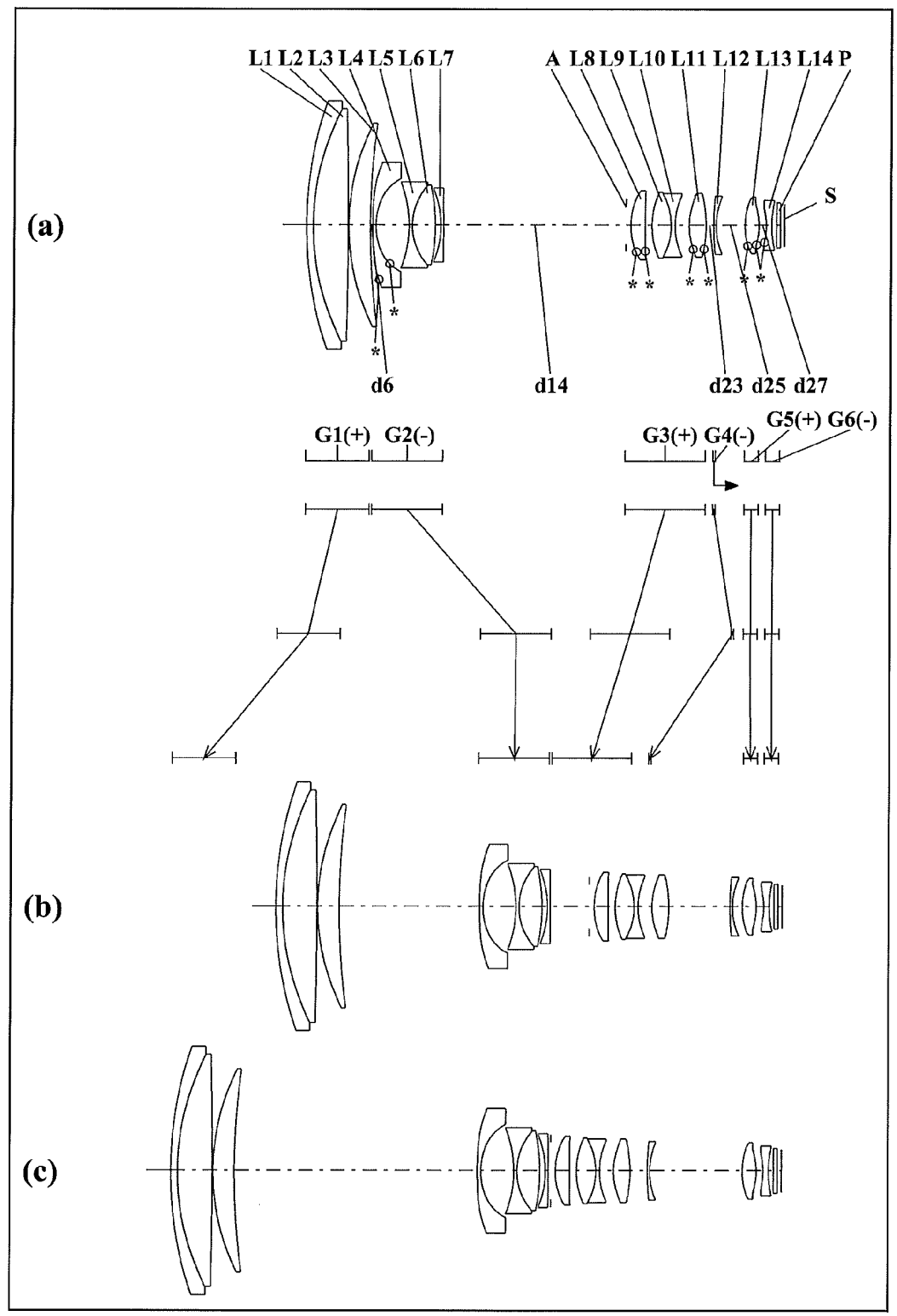
FIG. 13 is a lens arrangement diagram showing an infinity in-focus condition of a zoom lens system according to Embodiment 5 (Numerical Example 5)
Figure 14:
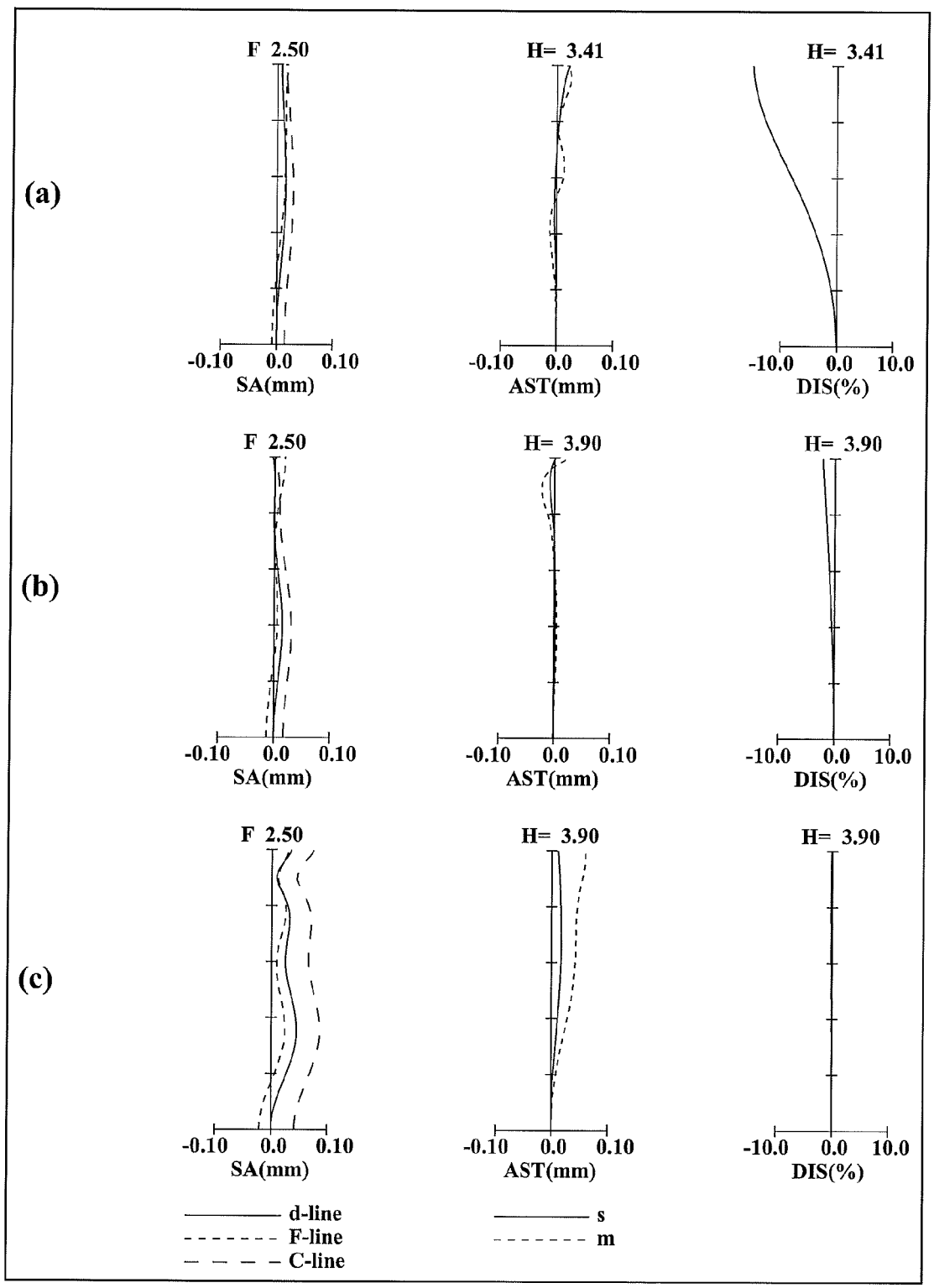
FIG. 14 is a longitudinal aberration diagram showing an infinity in-focus condition of the zoom lens system according to Numerical Example 5.
Figure 15:
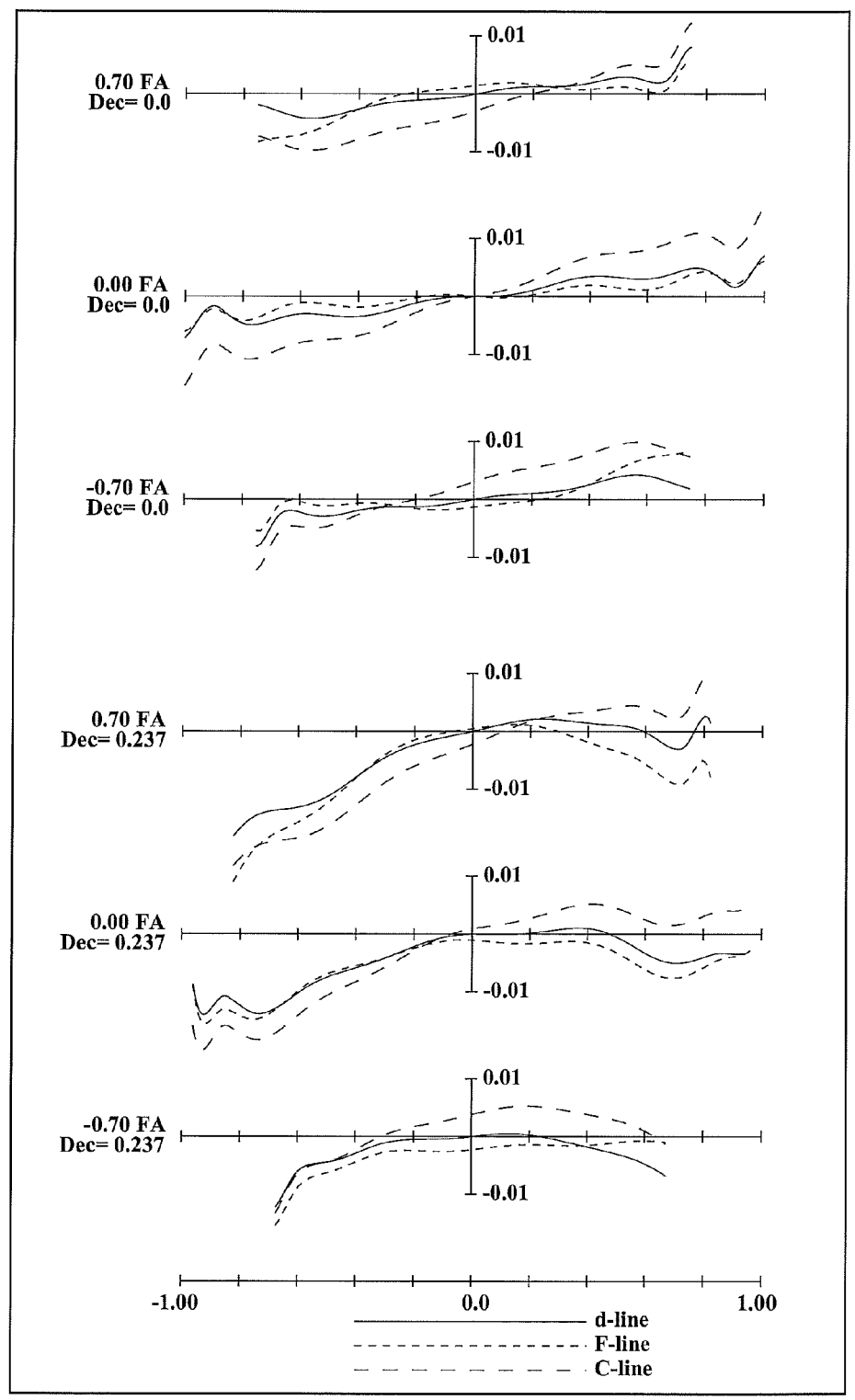
FIG. 15 is a lateral aberration diagram in a basic state where image blur compensation is not performed and in an image blur compensation state at a telephoto limit of the zoom lens system according to Numerical Example 5.

As shown in FIG. 13, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. Among these, the fifth lens element L5 and the sixth lens element L6 are cemented with each other. In the surface data of the corresponding Numerical Example described later, a surface number 10 is imparted to an adhesive layer between the fifth lens element L5 and the sixth lens element L6. The fourth lens element L4 has two aspheric surfaces.

The third lens unit G3, in order from the object side to the image side, comprises: a bi-convex eighth lens element L8; a bi-convex ninth lens element L9; a bi-concave tenth lens element L10; and a bi-convex eleventh lens element L11. Among these, the ninth lens element L9 and the tenth lens element L10 are cemented with each other. In the surface data of the corresponding Numerical Example described later, a surface number 19 is imparted to an adhesive layer between the ninth lens element L9 and the tenth lens element L10. The eighth lens element L8 has two aspheric surfaces, and the eleventh lens element L11 has two aspheric surfaces.

The fourth lens unit G4 comprises solely a negative meniscus twelfth lens element L12 with the convex surface facing the object side.

The fifth lens unit G5 comprises solely a bi-convex thirteenth lens element L13. The thirteenth lens element L13 has two aspheric surfaces.

The sixth lens unit G6 comprises solely a bi-concave fourteenth lens element L14. The fourteenth lens element L14 has an aspheric object side surface.

In the zoom lens system according to Embodiment 5, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 substantially monotonically moves to the object side, the fourth lens unit G4 moves to the object side with locus of a convex to the image side, the fifth lens unit G5 substantially monotonically moves to the image side, and the sixth lens unit G6 is fixed with respect to the image surface S. That is, in zooming, the first to fifth lens units G1 to G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 at the telephoto limit is larger than that at the wide-angle limit, the interval between the fourth lens unit G4 and the fifth lens unit G5 changes, and the interval between the fifth lens unit G5 and the sixth lens unit G6 decreases.

In the zoom lens system according to Embodiment 5, in focusing from an infinity in-focus condition to a close-object in-focus condition, the fourth lens unit G4 moves to the image side along the optical axis.

In the zoom lens systems according to Embodiments 1 to 5, the fourth lens unit G4 has negative optical power, the fifth lens unit G5 has positive optical power, and the sixth lens unit G6 has negative optical power. Therefore, various aberrations are favorably compensated over the entire zoom range, and further size reduction is achieved while maintaining high performance.

As described above, in the zoom lens systems according to Embodiments 1 to 5, the fourth lens unit G4 has negative optical power, the fifth lens unit G5 has positive optical power, and the sixth lens unit G6 has negative optical power. However, in the present disclosure, the optical powers of the lens units placed on the image side relative to the third lens unit G3 are not particularly limited.

In the zoom lens systems according to Embodiments 1 to 5, since each of the fifth lens unit G5 and the sixth lens unit G6 is composed of one lens element, further size reduction is achieved.

As described above, in the zoom lens systems according to Embodiments 1 to 5, each of the fifth lens unit G5 and the sixth lens unit G6 is composed of one lens element. However, in the present disclosure, the number of the lens elements constituting each of the fifth lens unit G5 and the sixth lens unit G6 is not particularly limited.

In the zoom lens systems according to Embodiments 1 to 5, in zooming from a wide-angle limit to a telephoto limit at the time of image taking, the first to fourth lens units G1 to G4 move along the optical axis so that the interval between the third lens unit G3 and the fourth lens unit G4 at the telephoto limit is larger than the interval at the wide-angle limit. Therefore, function in magnification change exhibited by the third lens unit G3 and the fourth lens unit G4 can be increased, whereby size reduction is achieved while achieving high magnification.

In the zoom lens systems according to Embodiments 1 to 5, focusing from an infinity in-focus condition to a close-object in-focus condition is performed by moving the fourth lens unit G4 along the optical axis. Therefore, the amount of movement of the fourth lens unit G4 can be reduced in the infinity in-focus condition and the close-object in-focus condition, whereby variation in aberration performance is suppressed. In addition, size reduction is also achieved.

In the zoom lens systems according to Embodiments 1 to 5, the aperture diaphragm A is placed on the object side relative to the third lens unit G3. In zooming from a wide-angle limit to a telephoto limit at the time of image taking, the aperture diaphragm A moves together with the third lens unit G3 along the optical axis. Therefore, aberration performance is favorably compensated, and size reduction is achieved. Specifically, if the interval between the aperture diaphragm A and the third lens unit G3 is increased at the wide-angle limit, the light beam passing inside the third lens unit G3 is increased, which makes it difficult to suppress various aberration, especially, spherical aberration. If the interval between the aperture diaphragm A and the third lens unit G3 is increased at the telephoto limit, the interval between the second lens unit G2 and the third lens unit G3 is increased, whereby the overall length of the zoom lens system at the telephoto limit is also increased, which makes it difficult to achieve size reduction.

The diameter of the aperture diaphragm A, which determines a maximum aperture, may have the same value or different values at the wide-angle limit and at the telephoto limit.

In the zoom lens systems according to Embodiments 1 to 5, the third lens unit G3 is an image blur compensating lens unit which is configured to be movable in a direction perpendicular to the optical axis to optically compensate image blur. By moving the image blur compensating lens unit in the direction perpendicular to the optical axis, image point movement caused by vibration of the entire system can be compensated. That is, image blur caused by hand blurring, vibration and the like can be compensated optically.

When compensating the image point movement caused by vibration of the entire system, the image blur compensating lens unit moves in the direction perpendicular to the optical axis. Thereby, image blur can be compensated in a state that size increase in the entire zoom lens system is suppressed to realize a compact configuration and that excellent imaging characteristics such as small decentering coma aberration and small decentering astigmatism are satisfied.

As described above, Embodiments 1 to 5 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 5 can satisfy. Here, a plurality of beneficial conditions is set forth for the zoom lens system according to each embodiment. A construction that satisfies all the plurality of conditions is most beneficial for the zoom lens system. However, when an individual condition is satisfied, a zoom lens system having the corresponding effect is obtained.

For example, in a zoom lens system like the zoom lens systems according to Embodiments 1 to 5, which comprises, in order from the object side to the image side, a first lens unit having positive optical power, a second lens unit having negative optical power, a third lens unit having positive optical power, a fourth lens unit having negative optical power, a fifth lens unit, and a sixth lens unit, in which, in zooming from a wide-angle limit to a telephoto limit at the time of image taking, the first lens unit, the second lens unit, the third lens unit, and the fourth lens unit move along the optical axis so that the interval between the third lens unit and the fourth lens unit at the telephoto limit is larger than that at the wide-angle limit, and focusing from an infinity in-focus condition to a close-object in-focus condition is performed by moving the fourth lens unit along the optical axis, the following condition (1) can be satisfied:

$$0.05 < D_4/f_T < 0.20 \quad (1)$$

where $D_4$ is an amount of movement of the fourth lens unit in zooming from the wide-angle limit to the telephoto limit at the time of image taking, and $f_T$ is a focal length of the zoom lens system at the telephoto limit.

The condition (1) sets forth a ratio between the amount of movement of the fourth lens unit in zooming and the focal length of the entire zoom lens system at the telephoto limit. When the value goes below the lower limit of the condition (1), the amount of movement of the fourth lens unit becomes excessively small, whereby function in magnification change exhibited by the fourth lens unit becomes excessively small. As a result, the lens units other than the fourth lens unit should bear magnification change, which makes it difficult to compensate various aberrations over the entire zoom lens system. In addition, the amounts of movement of the lens units other than the fourth lens unit are increased, and the overall length of the zoom lens system is excessively increased, which makes it difficult to provide compact lens barrels, imaging devices, and cameras. When the value exceeds the upper limit of the condition (1), the amount of movement of the fourth lens unit becomes excessively large, which makes it difficult to favorably compensate various aberrations such as chromatic aberration and curvature of field over the entire zoom lens system. In addition, the amount of movement of the fourth lens unit is increased, and the overall length of the zoom lens system is excessively increased, which makes it difficult to provide compact lens barrels, imaging devices, and cameras.

For example, in a zoom lens system like the zoom lens systems according to Embodiments 1 to 5, which comprises, in order from the object side to the image side, at least a first lens unit having positive optical power, a second lens unit having negative optical power, and a third lens unit having positive optical power, in which, in zooming from a wide-angle limit to a telephoto limit at the time of image taking, the first lens unit, the second lens unit, and the third lens unit move along the optical axis, the following conditions (2), (3) and (4) are satisfied:

$$0.7 < L_T/f_T < 1.5 \quad (2)$$

$$f_T/f_W > 12.0 \quad (3)$$

$$F_T/F_W < 1.4 \quad (4)$$

where $L_T$ is an overall length of the zoom lens system at the telephoto limit, being a distance from a most object side surface of the first lens unit to the image surface, $f_T$ is a focal length of the zoom lens system at the telephoto limit, $f_W$ is a focal length of the zoom lens system at the wide-angle limit, $F_T$ is an F-number at the telephoto limit, and $F_W$ is an F-number at the wide-angle limit.

The condition (2) sets forth a ratio between the overall length of the zoom lens system at the telephoto limit and the focal length of the entire zoom lens system at the telephoto limit. When the value goes below the lower limit of the condition (2), the overall length of the zoom lens system at the telephoto limit is excessively reduced, which makes it difficult to favorably perform aberration compensation at the telephoto limit. When the value exceeds the upper limit of the condition (2), the overall length of the zoom lens system at the telephoto limit is excessively increased, which makes it difficult to provide compact lens barrels, imaging devices, and cameras.

When at least one of the following conditions (2)' and (2)" is satisfied, the above-mentioned effect is achieved more successfully.

$$0.9 < L_T/f_T \quad (2)'$$

$$L_T/f_T < 1.3 \quad (2)''$$

The condition (3) sets forth a ratio between the focal length of the entire zoom lens system at the telephoto ratio and the focal length of the entire zoom lens system at the wide-angle limit, that is, a zoom ratio. When the condition (3) is not satisfied, the zoom ratio is small, which makes it difficult to provide zoom lens systems, imaging devices, and cameras, having sufficient magnification.

When the following condition (3)' is satisfied, the above-mentioned effect is achieved more successfully.

$$f_T/f_W > 20.0 \quad (3)'$$

The condition (4) sets forth a ratio between the F-number at the telephoto limit and the F-number at the wide-angle limit. When the condition (4) is not satisfied, the F-number at the telephoto limit becomes excessively large relative to the F-number at the wide-angle limit, which makes it difficult to provide zoom lens system, imaging devices, and cameras, having sufficient brightness at the telephoto limit.

When the following condition (4)' is satisfied, the above-mentioned effect is achieved more successfully.

$$F_T/F_W < 1.2 \quad (4)'$$

Each of the lens units constituting the zoom lens systems according to Embodiments 1 to 5 is composed exclusively of refractive type lens elements that deflect the incident light by refraction (that is, lens elements of a type in which deflection is achieved at the interface between media each having a distinct refractive index). However, the present disclosure is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in the refractive-diffractive hybrid type lens elements, when a diffraction structure is formed in the interface between media having mutually different refractive indices, wavelength dependence in the diffraction efficiency is improved.

Moreover, in each embodiment, a configuration has been described that on the object side relative to the image surface S (between the image surface S and the most image side lens surface of the sixth lens unit G6), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves desired characteristics of optical cut-off frequency by diffraction.

Embodiment 6

Figure 16:
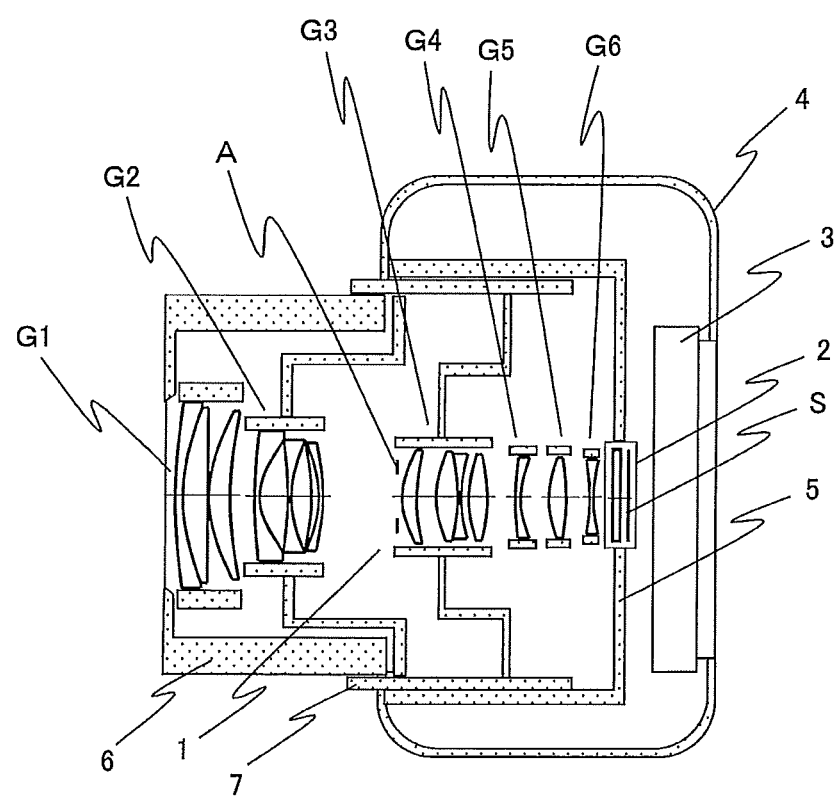
FIG. 16 is a schematic configuration diagram of a digital still camera according to Embodiment 6.

FIG. 16 is a schematic configuration diagram of a digital still camera according to Embodiment 6. In FIG. 16, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 16, the zoom lens system 1, in order from the object side to the image side, comprises a first lens unit G1, a second lens unit G2, an aperture diaphragm A, a third lens unit G3, a fourth lens unit G4, a fifth lens unit G5, and a sixth lens unit G6. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A and the third lens unit G3, the fourth lens unit G4, the fifth lens unit G5, and the sixth lens unit G6 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 16, any one of the zoom lens systems according to Embodiments 2 to 5 may be employed in place of the zoom lens system according to Embodiment 1. Further, the optical system of the digital still camera shown in FIG. 16 is applicable also to a digital video camera for moving images. In this case, moving images with high resolution can be acquired in addition to still images.

Here, the digital still camera according to the present Embodiment 6 has been described for a case that the employed zoom lens system 1 is a zoom lens system according to Embodiments 1 to 5. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 5.

Further, Embodiment 6 has been described for a case that the zoom lens system is applied to a lens barrel of so-called barrel retraction construction. However, the present disclosure is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 6, the zoom lens system may be applied to a so-called sliding lens barrel in which a part of the lens units constituting the zoom lens system like the entirety of the second lens unit G2, the entirety of the third lens unit G3, a part of the second lens unit G2, or a part of the third lens unit G3 is caused to escape from the optical axis at the time of barrel retraction.

An imaging device comprising a zoom lens system according to Embodiments 1 to 5, and an image sensor such as a CCD or a CMOS may be applied to a camera for a mobile terminal device such as a smart-phone, a surveillance camera in a surveillance system, a Web camera, a vehicle-mounted camera or the like.

As described above, Embodiment 6 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 5 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \Sigma A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 5, 8, 11, and 14 are longitudinal aberration diagrams of the zoom lens systems according to Numerical Examples 1 to 5, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, and 15 are lateral aberration diagrams of the zoom lens systems at a telephoto limit according to Numerical Examples 1 to 5, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line, and the long dash line indicate the characteristics to the d-line, the F-line, and the C-line, respectively. In each lateral aberration diagram, the meridional plane is adopted as the plane containing the optical axis of the first lens unit G1 and the optical axis of the third lens unit G3.

Here, in the zoom lens system according to each example, the amount of movement of the image blur compensating lens unit in a direction perpendicular to the optical axis in an image blur compensation state at a telephoto limit is as follows.

| Numerical Example 1 | 0.214 mm |
| Numerical Example 2 | 0.210 mm |
| Numerical Example 3 | 0.215 mm |
| Numerical Example 4 | 0.250 mm |
| Numerical Example 5 | 0.237 mm |

Here, when the shooting distance is infinity, at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data.

TABLE 1

(Surface data)

| Surface number | r | d | nd | vd |
|---|---|---|---|---|
| Object surface | ∞ | | | |
| 1 | 80.38640 | 1.40000 | 1.84666 | 23.8 |
| 2 | 53.08730 | 0.01000 | 1.56732 | 42.8 |
| 3 | 53.08730 | 5.91570 | 1.49700 | 81.6 |
| 4 | −427.75360 | 0.15000 | | |
| 5 | 47.31150 | 3.54490 | 1.59282 | 68.6 |
| 6 | 127.17770 | Variable | | |
| 7* | 1000.00000 | 0.70000 | 1.88202 | 37.2 |
| 8* | 12.38510 | 4.58100 | | |
| 9 | −28.39050 | 0.55000 | 1.77250 | 49.6 |
| 10 | 12.36070 | 0.01000 | 1.56732 | 42.8 |
| 11 | 12.36070 | 3.67970 | 1.92286 | 20.9 |
| 12 | −51.96170 | 1.26980 | | |
| 13 | −17.75000 | 0.55000 | 1.84666 | 23.8 |
| 14 | −36.34810 | Variable | | |
| 15(Diaphragm) | ∞ | 1.00000 | | |
| 16* | 14.09100 | 2.63060 | 1.58332 | 59.1 |
| 17* | 73.19700 | 2.44310 | | |
| 18 | 14.31860 | 4.20000 | 1.48749 | 70.4 |
| 19 | −14.31860 | 0.01000 | 1.56732 | 42.8 |
| 20 | −14.31860 | 0.80000 | 1.64769 | 33.8 |
| 21 | 14.31860 | 2.03170 | | |
| 22* | 14.05690 | 3.80690 | 1.51776 | 69.9 |
| 23* | −20.22820 | Variable | | |
| 24 | 90.88390 | 0.99560 | 1.49700 | 81.6 |
| 25 | 14.50130 | Variable | | |
| 26* | 10.75510 | 3.30000 | 1.51776 | 69.9 |
| 27* | −15.56410 | Variable | | |
| 28* | −11.55200 | 0.87360 | 1.54410 | 56.1 |
| 29 | 20.74910 | 1.00000 | | |
| 30 | ∞ | 0.78000 | 1.51680 | 64.2 |
| 31 | ∞ | (BF) | | |
| Image surface | ∞ | | | |

TABLE 2

(Aspherical data)

Surface No. 7

K = 0.00000E+00, A4 = 5.35704E−05, A6 = 4.65344E−07,
A8 = −7.25267E−09 A10 = 2.22110E−11, A12 = 8.30852E−15,
A14 = 0.00000E+00

Surface No. 8

K = 0.00000E+00, A4 = 5.50272E−05, A6 = 3.09902E−07,
A8 = 3.07019E−08 A10 = −2.86257E−10, A12 = −4.52816E−13,
A14 = 0.00000E+00

Surface No. 16

K = 0.00000E+00, A4 = 3.48800E−06, A6 = −1.42689E−06,
A8 = 1.35938E−07 A10 = −3.63061E−09, A12 = 4.20870E−11,
A14 = −1.53813E−16

Surface No. 17

K = 0.00000E+00, A4 = 2.92293E−05, A6 = −2.39842E−06,
A8 = 2.21752E−07 A10 = −6.29904E−09, A12 = 7.24108E−11,
A14 = −5.87135E−16

Surface No. 22

K = 0.00000E+00, A4 = −1.48035E−04, A6 = −4.24178E−07,
A8 = 5.45212E−08 A10 = −1.39274E−09, A12 = 0.00000E+00,
A14 = 0.00000E+00

Surface No. 23

K = 0.00000E+00, A4 = 2.14264E−05, A6 = −4.49634E−07,
A8 = 4.61173E−08 A10 = −1.19672E−09, A12 = 0.00000E+00,
A14 = 0.00000E+00

Surface No. 26

K = 0.00000E+00, A4 = −1.62288E−04, A6 = 6.30224E−06,
A8 = −2.17877E−07 A10 = 4.94955E−10, A12 = 0.00000E+00,
A14 = 0.00000E+00

Surface No. 27

K = 0.00000E+00, A4 = 2.37250E−04, A6 = 7.41232E−06,
A8 = −4.10461E−07 A10 = 4.09234E−09, A12 = 0.00000E+00,
A14 = 0.00000E+00

Surface No. 28

K = 0.00000E+00, A4 = 1.55938E−03, A6 = −4.44918E−05,
A8 = 1.30805E−06 A10 = −1.79649E−08, A12 = 0.00000E+00,
A14 = 0.00000E+00

TABLE 3

(Various data)

Zooming ratio 22.21907

|  | Wide-angle limit | Middle position | Telephoto limit |
|---|---|---|---|
| Focal length | 4.6399 | 21.8698 | 103.0950 |
| F-number | 2.90063 | 2.90020 | 2.90012 |
| Half view angle | 40.7907 | 10.4346 | 2.2365 |
| Image height | 3.4100 | 3.9020 | 3.9020 |
| Overall length of lens system | 89.3284 | 96.5798 | 125.0498 |
| BF | 0.86417 | 0.87415 | 0.84363 |
| d6 | 0.5000 | 22.7670 | 51.7865 |
| d14 | 32.7666 | 5.2446 | 0.5000 |
| d23 | 1.5008 | 14.2646 | 6.7433 |
| d25 | 4.7802 | 5.2935 | 18.1364 |
| d27 | 2.6840 | 1.9034 | 0.8074 |
| Entrance pupil position | 20.8000 | 65.3027 | 331.5043 |
| Exit pupil position | −25.7393 | −33.0473 | −57.2754 |
| Front principal points position | 24.6307 | 73.0726 | 251.7233 |
| Back principal points position | 84.6884 | 74.7100 | 21.9548 |

TABLE 3-continued (Various data)

Single lens data

| Lens element | Initial surface number | Focal length |
|---|---|---|
| 1 | 1 | −189.0808 |
| 2 | 3 | 95.4127 |
| 3 | 5 | 125.0190 |
| 4 | 7 | −14.2225 |
| 5 | 9 | −11.0823 |
| 6 | 11 | 11.1255 |
| 7 | 13 | −41.5364 |
| 8 | 16 | 29.4329 |
| 9 | 18 | 15.4276 |
| 10 | 20 | −10.9335 |
| 11 | 22 | 16.6488 |
| 12 | 24 | −34.8681 |
| 13 | 26 | 12.8328 |
| 14 | 28 | −13.5096 |

Zoom lens unit data

| Lens unit | Initial surface No. | Focal length | Overall length of lens unit | Front principal points position | Back principal points position |
|---|---|---|---|---|---|
| 1 | 1 | 76.99427 | 11.02060 | 2.24926 | 6.15356 |
| 2 | 7 | −9.91095 | 11.34050 | 1.67140 | 4.91428 |
| 3 | 15 | 16.66467 | 16.92230 | 7.57014 | 8.08711 |
| 4 | 24 | −34.86815 | 0.99560 | 0.79477 | 1.12241 |
| 5 | 26 | 12.83282 | 3.30000 | 0.92819 | 1.95678 |
| 6 | 28 | −13.50956 | 2.65360 | 0.20043 | 0.77936 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.16506 | −0.26235 | −1.13160 |
| 3 | 15 | −0.40016 | −1.10455 | −0.87904 |
| 4 | 24 | 1.53837 | 1.47178 | 1.74972 |
| 5 | 26 | 0.49313 | 0.55342 | 0.64048 |
| 6 | 28 | 1.20270 | 1.20344 | 1.20118 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data.

TABLE 4

(Surface data)

| Surface number | r | d | nd | vd |
|---|---|---|---|---|
| Object surface | ∞ |  |  |  |
| 1 | 84.41040 | 1.40000 | 1.84666 | 23.8 |
| 2 | 54.78730 | 0.01000 | 1.56732 | 42.8 |
| 3 | 54.78730 | 5.47000 | 1.49700 | 81.6 |
| 4 | −307.33830 | 0.15000 |  |  |
| 5 | 44.96750 | 3.43000 | 1.59282 | 68.6 |
| 6 | 107.82550 | Variable |  |  |
| 7* | 283.42180 | 0.70000 | 1.80500 | 41.0 |
| 8* | 12.27460 | 5.16690 |  |  |
| 9 | −26.03490 | 0.65000 | 1.77250 | 49.6 |
| 10 | 12.39940 | 0.01000 | 1.56732 | 42.8 |
| 11 | 12.39940 | 3.66000 | 1.92286 | 20.9 |
| 12 | −63.96980 | 1.41520 |  |  |

TABLE 4-continued (Surface data)

| Surface number | r | d | nd | vd |
|---|---|---|---|---|
| 13 | −17.65500 | 0.55000 | 1.84666 | 23.8 |
| 14 | −39.04090 | Variable | | |
| 15(Diaphragm) | ∞ | 1.00000 | | |
| 16* | 14.59700 | 2.66000 | 1.58332 | 59.1 |
| 17* | 195.60410 | 2.63140 | | |
| 18 | 14.35680 | 4.20000 | 1.48749 | 70.4 |
| 19 | −13.66430 | 0.01000 | 1.56732 | 42.8 |
| 20 | −13.66430 | 0.80000 | 1.64769 | 33.8 |
| 21 | 14.76440 | 2.90000 | | |
| 22* | 13.37660 | 3.48000 | 1.51776 | 69.9 |
| 23* | −25.00000 | Variable | | |
| 24 | 21.33210 | 0.50000 | 1.49700 | 81.6 |
| 25 | 9.38540 | Variable | | |
| 26* | 18.06850 | 3.30000 | 1.54410 | 56.1 |
| 27* | −17.97860 | Variable | | |
| 28* | −11.26470 | 1.09000 | 1.54410 | 56.1 |
| 29 | 440.74570 | 1.00000 | | |
| 30 | ∞ | 0.78000 | 1.51680 | 64.2 |
| 31 | ∞ | (BF) | | |
| Image surface | ∞ | | | |

TABLE 5

(Aspherical data)

Surface No. 7

K = 0.00000E+00, A4 = 4.38493E−05, A6 = 5.30075E−07,
A8 = −6.11003E−09 A10 = 1.52956E−11, A12 = 8.30852E−15,
A14 = 0.00000E+00
Surface No. 8

K = 0.00000E+00, A4 = 5.58387E−05, A6 = 5.27818E−07,
A8 = 2.21787E−08 A10 = −8.88913E−11, A12 = −4.52816E−13,
A14 = 0.00000E+00
Surface No. 16

K = 0.00000E+00, A4 = 2.00544E−05, A6 = −1.35728E−06,
A8 = 1.31657E−07 A10 = −3.41192E−09, A12 = 4.20870E−11,
A14 = −1.53813E−16
Surface No. 17

K = 0.00000E+00, A4 = 4.71991E−05, A6 = −2.53319E−06,
A8 = 2.18726E−07 A10 = −6.02035E−09, A12 = 7.24108E−11,
A14 = −5.87135E−16
Surface No. 22

K = 0.00000E+00, A4 = −1.09419E−04, A6 = −5.79182E−07,
A8 = 5.91557E−08 A10 = −1.17679E−09, A12 = 0.00000E+00,
A14 = 0.00000E+00
Surface No. 23

K = 0.00000E+00, A4 = 5.14361E−05, A6 = −3.30779E−07,
A8 = 4.96534E−08 A10 = −1.06024E−09, A12 = 0.00000E+00,
A14 = 0.00000E+00
Surface No. 26

K = 0.00000E+00, A4 = −1.54005E−04, A6 = 2.16390E−06,
A8 = −1.24191E−07 A10 = 1.33463E−09, A12 = 0.00000E+00,
A14 = 0.00000E+00
Surface No. 27

K = 0.00000E+00, A4 = 1.04292E−04, A6 = 8.68906E−06,
A8 = −3.82250E−07 A10 = 5.58455E−09, A12 = 0.00000E+00,
A14 = 0.00000E+00
Surface No. 28

K = 0.00000E+00, A4 = 1.46492E−03, A6 = −1.95582E−05,
A8 = 2.74882E−07 A10 = −4.53479E−10, A12 = 0.00000E+00,
A14 = 0.00000E+00

TABLE 6

(Various data)

Zooming ratio 22.22135

| | Wide-angle limit | Middle position | Telephoto limit |
|---|---|---|---|
| Focal length | 4.6398 | 21.8696 | 103.1025 |
| F-number | 2.90008 | 2.89986 | 2.90043 |
| Half view angle | 40.8126 | 10.3718 | 2.2358 |
| Image height | 3.4100 | 3.9020 | 3.9020 |
| Overall length of lens system | 96.5170 | 95.5082 | 122.6972 |
| BF | 0.86490 | 0.86532 | 0.85221 |
| d6 | 0.5000 | 22.0610 | 51.5230 |
| d14 | 39.0933 | 5.1449 | 0.5000 |
| d23 | 1.5016 | 16.1964 | 9.0765 |
| d25 | 5.3571 | 1.9960 | 12.9820 |
| d27 | 2.2366 | 2.2811 | 0.8000 |
| Entrance pupil position | 21.3078 | 63.9241 | 336.7968 |
| Exit pupil position | −29.2375 | −29.6516 | −48.1944 |
| Front principal points position | 25.2325 | 70.1211 | 223.1641 |
| Back principal points position | 91.8772 | 73.6386 | 19.5947 |

Single lens data

| Lens element | Initial surface number | Focal length |
|---|---|---|
| 1 | 1 | −188.4726 |
| 2 | 3 | 94.0301 |
| 3 | 5 | 127.5279 |
| 4 | 7 | −15.9566 |
| 5 | 9 | −10.7932 |
| 6 | 11 | 11.5193 |
| 7 | 13 | −38.5213 |
| 8 | 16 | 26.8964 |
| 9 | 18 | 15.1032 |
| 10 | 20 | −10.8368 |
| 11 | 22 | 17.3675 |
| 12 | 24 | −34.1949 |
| 13 | 26 | 17.1147 |
| 14 | 28 | −20.1703 |

Zoom lens unit data

| Lens unit | Initial surface No. | Focal length | Overall length of lens unit | Front principal points position | Back principal points position |
|---|---|---|---|---|---|
| 1 | 1 | 76.85520 | 10.46000 | 2.03474 | 5.76639 |
| 2 | 7 | −9.53363 | 12.15210 | 2.33810 | 5.90644 |
| 3 | 15 | 16.70504 | 17.68140 | 8.18918 | 7.90966 |
| 4 | 24 | −34.19489 | 0.50000 | 0.60480 | 0.76609 |
| 5 | 26 | 17.11471 | 3.30000 | 1.10696 | 2.19855 |
| 6 | 28 | −20.17027 | 2.87000 | 0.01758 | 0.66802 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.15945 | −0.24938 | −1.08746 |
| 3 | 15 | −0.34892 | −1.12980 | −0.92136 |
| 4 | 24 | 1.45267 | 1.35751 | 1.58666 |
| 5 | 26 | 0.64839 | 0.64577 | 0.73289 |
| 6 | 28 | 1.15205 | 1.15207 | 1.15142 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows the various data.

TABLE 7

(Surface data)

| Surface number | r | d | nd | vd |
|---|---|---|---|---|
| Object surface | ∞ | | | |
| 1 | 86.31960 | 1.40000 | 1.84666 | 23.8 |
| 2 | 55.60180 | 0.01000 | 1.56732 | 42.8 |
| 3 | 55.60180 | 5.47000 | 1.49700 | 81.6 |
| 4 | −279.47210 | 0.15000 | | |
| 5 | 45.23330 | 3.43000 | 1.59282 | 68.6 |
| 6 | 109.72110 | Variable | | |
| 7* | 155.76370 | 0.70000 | 1.80500 | 41.0 |
| 8* | 12.04000 | 5.30310 | | |
| 9 | −25.63560 | 0.65000 | 1.77250 | 49.6 |
| 10 | 12.07150 | 0.01000 | 1.56732 | 42.8 |
| 11 | 12.07150 | 3.66000 | 1.92286 | 20.9 |
| 12 | −60.40720 | 1.52570 | | |
| 13 | −16.38790 | 0.55000 | 1.84666 | 23.8 |
| 14 | −33.25120 | Variable | | |
| 15(Diaphragm) | ∞ | 1.00000 | | |
| 16* | 14.07800 | 2.66000 | 1.58332 | 59.1 |
| 17* | 110.60450 | 3.26150 | | |
| 18 | 14.38670 | 4.20000 | 1.48749 | 70.4 |
| 19 | −12.40040 | 0.01000 | 1.56732 | 42.8 |
| 20 | −12.40040 | 0.80000 | 1.64769 | 33.8 |
| 21 | 14.76440 | 2.90000 | | |
| 22* | 13.37660 | 3.48000 | 1.51776 | 69.9 |
| 23* | −25.00000 | Variable | | |
| 24 | 39.03180 | 0.50000 | 1.49700 | 81.6 |
| 25 | 13.11540 | Variable | | |
| 26* | 12.27840 | 3.30000 | 1.54410 | 56.1 |
| 27* | −12.33230 | Variable | | |
| 28* | −9.81250 | 1.09000 | 1.54410 | 56.1 |
| 29 | 21.36130 | 1.00000 | | |
| 30 | ∞ | 0.78000 | 1.51680 | 64.2 |
| 31 | ∞ | (BF) | | |
| Image surface | ∞ | | | |

TABLE 8

(Aspherical data)

Surface No. 7

K = 0.00000E+00, A4 = 4.18016E−05, A6 = 6.27207E−07,
A8 = −6.73152E−09 A10 = 1.63026E−11, A12 = 8.30852E−15,
A14 = 0.00000E+00

Surface No. 8

K = 0.00000E+00, A4 = 5.07841E−05, A6 = 6.06733E−07,
A8 = 2.61719E−08 A10 = −9.05126E−11, A12 = −4.52816E−13,
A14 = 0.00000E+00

Surface No. 16

K = 0.00000E+00, A4 = 8.17589E−06, A6 = −1.31105E−06,
A8 = 1.31005E−07 A10 = −3.43152E−09, A12 = 4.20870E−11,
A14 = −1.53813E−16

Surface No. 17

K = 0.00000E+00, A4 = 3.82028E−05, A6 = −2.62741E−06,
A8 = 2.19488E−07 A10 = −6.05000E−09, A12 = 7.24108E−11,
A14 = −5.87135E−16

Surface No. 22

K = 0.00000E+00, A4 = −1.01230E−04, A6 = −6.53434E−07,
A8 = 5.69916E−08 A10 = −1.21030E−09, A12 = 0.00000E+00,
A14 = 0.00000E+00

Surface No. 23

K = 0.00000E+00, A4 = 5.63360E−05, A6 = −4.20103E−07,
A8 = 4.76244E−08 A10 = −1.09765E−09, A12 = 0.00000E+00,
A14 = 0.00000E+00

TABLE 8-continued (Aspherical data)

Surface No. 26

K = 0.00000E+00, A4 = −1.43850E−04, A6 = 4.28820E−06,
A8 = −1.33364E−07 A10 = 3.14965E−09, A12 = 0.00000E+00,
A14 = 0.00000E+00

Surface No. 27

K = 0.00000E+00, A4 = 4.78110E−04, A6 = 6.53552E−06,
A8 = −3.36027E−07 A10 = 7.66131E−09, A12 = 0.00000E+00,
A14 = 0.00000E+00

Surface No. 28

K = 0.00000E+00, A4 = 1.83072E−03, A6 = −2.71355E−05,
A8 = 2.63493E−07 A10 = 5.50617E−09, A12 = 0.00000E+00,
A14 = 0.00000E+00

TABLE 9

(Various data)

Zooming ratio 22.22074

| | Wide-angle limit | Middle position | Telephoto limit |
|---|---|---|---|
| Focal length | 4.6399 | 21.8705 | 103.1027 |
| F-number | 2.90019 | 2.90032 | 2.90022 |
| Half view angle | 40.8220 | 10.4137 | 2.2379 |
| Image height | 3.4100 | 3.9020 | 3.9020 |
| Overall length of lens system | 89.5347 | 98.2937 | 128.0535 |
| BF | 0.86975 | 0.85945 | 0.84822 |
| d6 | 0.5000 | 24.3050 | 51.2109 |
| d14 | 32.6582 | 4.7118 | 0.5000 |
| d23 | 3.9654 | 17.0043 | 4.7742 |
| d25 | 1.9994 | 1.9964 | 21.8535 |
| d27 | 1.7016 | 1.5765 | 1.0264 |
| Entrance pupil position | 21.2392 | 71.8720 | 335.1599 |
| Exit pupil position | −26.2637 | −32.4471 | −83.8206 |
| Front principal points position | 25.0857 | 79.3814 | 312.7126 |
| Back principal points position | 84.8947 | 76.4233 | 24.9508 |

Single lens data

| Lens element | Initial surface number | Focal length |
|---|---|---|
| 1 | 1 | −188.4814 |
| 2 | 3 | 93.8194 |
| 3 | 5 | 127.3019 |
| 4 | 7 | −16.2447 |
| 5 | 9 | −10.5447 |
| 6 | 11 | 11.1727 |
| 7 | 13 | −38.7454 |
| 8 | 16 | 27.3762 |
| 9 | 18 | 14.4018 |
| 10 | 20 | −10.2868 |
| 11 | 22 | 17.3675 |
| 12 | 24 | −40.0002 |
| 13 | 26 | 11.8687 |
| 14 | 28 | −12.2073 |

Zoom lens unit data

| Lens unit | Initial surface No. | Focal length | Overall length of lens unit | Front principal points position | Back principal points position |
|---|---|---|---|---|---|
| 1 | 1 | 76.58004 | 10.46000 | 2.10862 | 5.83858 |
| 2 | 7 | −9.75851 | 12.39880 | 2.37607 | 5.96050 |
| 3 | 15 | 17.29164 | 18.31150 | 8.70607 | 8.01016 |

TABLE 9-continued (Various data)

| | | | | | |
|---|---|---|---|---|---|
| 4 | 24 | −40.00019 | 0.50000 | 0.50627 | 0.67012 |
| 5 | 26 | 11.86872 | 3.30000 | 1.11912 | 2.17597 |
| 6 | 28 | −12.20733 | 2.87000 | 0.21949 | 0.87793 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.16450 | −0.27474 | −1.13298 |
| 3 | 15 | −0.41294 | −1.15246 | −0.90214 |
| 4 | 24 | 1.31835 | 1.30752 | 1.76283 |
| 5 | 26 | 0.54810 | 0.55921 | 0.60618 |
| 6 | 28 | 1.23443 | 1.23359 | 1.23267 |

Numerical Example 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows the various data.

TABLE 10

(Surface data)

| Surface number | r | d | nd | vd |
|---|---|---|---|---|
| Object surface | ∞ | | | |
| 1 | 76.77810 | 1.40000 | 1.84666 | 23.8 |
| 2 | 51.74840 | 0.01000 | 1.56732 | 42.8 |
| 3 | 51.74840 | 9.67880 | 1.49700 | 81.6 |
| 4 | −774.08150 | 0.15000 | | |
| 5 | 40.67490 | 4.96510 | 1.59282 | 68.6 |
| 6 | 93.84660 | Variable | | |
| 7* | 1000.00000 | 0.70000 | 1.80500 | 41.0 |
| 8* | 18.10200 | 6.97910 | | |
| 9 | −31.25220 | 0.65000 | 1.77250 | 49.6 |
| 10 | 11.54730 | 0.01000 | 1.56732 | 42.8 |
| 11 | 11.54730 | 5.74060 | 1.92286 | 20.9 |
| 12 | −43.31600 | 0.96440 | | |
| 13 | −23.58020 | 0.55000 | 1.84666 | 23.8 |
| 14 | 63.17730 | Variable | | |
| 15(Diaphragm) | ∞ | 1.00000 | | |
| 16* | 15.45470 | 2.92040 | 1.58332 | 59.1 |
| 17* | −736.39480 | 0.50000 | | |
| 18 | 14.36600 | 4.20000 | 1.48749 | 70.4 |
| 19 | −13.92460 | 0.01000 | 1.56732 | 42.8 |
| 20 | −13.92460 | 0.80000 | 1.64769 | 33.8 |
| 21 | 14.76440 | 2.90000 | | |
| 22* | 13.37660 | 3.48000 | 1.51776 | 69.9 |
| 23* | −25.00000 | Variable | | |
| 24 | −309.47300 | 0.50000 | 1.49700 | 81.6 |
| 25 | 16.33030 | Variable | | |
| 26* | 16.12680 | 3.30000 | 1.54410 | 56.1 |
| 27* | −8.59250 | Variable | | |
| 28* | −8.60680 | 1.09000 | 1.54410 | 56.1 |
| 29 | 21.35880 | 1.00000 | | |
| 30 | ∞ | 0.78000 | 1.51680 | 64.2 |
| 31 | ∞ | (BF) | | |
| Image surface | ∞ | | | |

TABLE 11

(Aspherical data)

Surface No. 7

K = 0.00000E+00, A4 = 1.54891E−05, A6 = 4.32295E−07,
A8 = −1.70160E−09 A10 = −9.56497E−13, A12 = 8.30852E−15,
A14 = 0.00000E+00

Surface No. 8

K = 0.00000E+00, A4 = 2.44340E−05, A6 = 5.67445E−07,
A8 = −9.23392E−10 A10 = 1.16767E−10, A12 = −4.52816E−13,
A14 = 0.00000E+00

Surface No. 16

K = 0.00000E+00, A4 = 1.70477E−05, A6 = −1.56759E−06,
A8 = 1.21695E−07 A10 = −3.46611E−09, A12 = 4.20870E−11,
A14 = −1.53813E−16

Surface No. 17

K = 0.00000E+00, A4 = 2.51373E−05, A6 = −2.94271E−06,
A8 = 2.17038E−07 A10 = −6.26625E−09, A12 = 7.24108E−11,
A14 = −5.87135E−16

Surface No. 22

K = 0.00000E+00, A4 = −1.21862E−04, A6 = −5.87339E−07,
A8 = 5.29754E−08 A10 = −1.07619E−09, A12 = 0.00000E+00,
A14 = 0.00000E+00

Surface No. 23

K = 0.00000E+00, A4 = 5.39483E−05, A6 = −5.86702E−07,
A8 = 5.65871E−08 A10 = −1.17720E−09, A12 = 0.00000E+00,
A14 = 0.00000E+00

Surface No. 26

K = 0.00000E+00, A4 = −2.48433E−04, A6 = 7.62607E−06,
A8 = 1.60117E−07 A10 = 4.66949E−09, A12 = 0.00000E+00,
A14 = 0.00000E+00

Surface No. 27

K = 0.00000E+00, A4 = 1.03431E−03, A6 = 2.39928E−06,
A8 = 1.50495E−07 A10 = 1.23473E−08, A12 = 0.00000E+00,
A14 = 0.00000E+00

Surface No. 28

K = 0.00000E+00, A4 = 2.90825E−03, A6 = −6.79142E−05,
A8 = 2.28889E−06 A10 = −3.41163E−08, A12 = 0.00000E+00,
A14 = 0.00000E+00

TABLE 12

(Various data)

Zooming ratio 28.00356

| | Wide-angle limit | Middle position | Telephoto limit |
|---|---|---|---|
| Focal length | 4.6397 | 24.5522 | 129.9269 |
| F-number | 2.90018 | 2.90046 | 2.90047 |
| Half view angle | 41.3696 | 9.7236 | 1.8083 |
| Image height | 3.4100 | 3.9020 | 3.9020 |
| Overall length of lens system | 103.4994 | 107.9156 | 132.2629 |
| BF | 0.86242 | 0.86454 | 0.82628 |
| d6 | 0.5000 | 29.1093 | 47.3190 |
| d14 | 39.3966 | 8.5764 | 0.5000 |
| d23 | 1.7355 | 11.6609 | 1.9970 |
| d25 | 4.9809 | 1.9993 | 26.1179 |
| d27 | 1.7456 | 1.4268 | 1.2243 |
| Entrance pupil position | 30.9726 | 125.4345 | 378.6119 |
| Exit pupil position | −24.6835 | −24.2125 | −101.0576 |
| Front principal points position | 34.7696 | 125.9483 | 342.8503 |
| Back principal points position | 98.8598 | 83.3634 | 2.3360 |

TABLE 12-continued (Various data)

Single lens data

| Lens element | Initial surface number | Focal length |
|---|---|---|
| 1 | 1 | −192.4201 |
| 2 | 3 | 97.9788 |
| 3 | 5 | 117.0320 |
| 4 | 7 | −22.9088 |
| 5 | 9 | −10.8432 |
| 6 | 11 | 10.4013 |
| 7 | 13 | −20.2223 |
| 8 | 16 | 25.9870 |
| 9 | 18 | 15.2466 |
| 10 | 20 | −10.9441 |
| 11 | 22 | 17.3675 |
| 12 | 24 | −31.1951 |
| 13 | 26 | 10.8113 |
| 14 | 28 | −11.1323 |

Zoom lens unit data

| Lens unit | Initial surface No. | Focal length | Overall length of lens unit | Front principal points position | Back principal points position |
|---|---|---|---|---|---|
| 1 | 1 | 75.35494 | 16.20390 | 3.25350 | 8.94907 |
| 2 | 7 | −9.77320 | 15.59410 | 4.48558 | 10.14794 |
| 3 | 15 | 15.65146 | 15.81040 | 6.61409 | 7.52575 |
| 4 | 24 | −31.19509 | 0.50000 | 0.31710 | 0.48327 |
| 5 | 26 | 10.81132 | 3.30000 | 1.46311 | 2.52044 |
| 6 | 28 | −11.13232 | 2.87000 | 0.20019 | 0.85897 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.18322 | −0.39516 | −1.49842 |
| 3 | 15 | −0.33041 | −0.84055 | −0.73390 |
| 4 | 24 | 1.50632 | 1.37724 | 2.12852 |
| 5 | 26 | 0.53666 | 0.56603 | 0.58700 |
| 6 | 28 | 1.25812 | 1.25831 | 1.25487 |

Numerical Example 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows the various data.

TABLE 13

(Surface data)

| Surface number | r | d | nd | vd |
|---|---|---|---|---|
| Object surface | ∞ | | | |
| 1 | 80.12480 | 1.40000 | 1.84666 | 23.8 |
| 2 | 53.41990 | 0.01000 | 1.56732 | 42.8 |
| 3 | 53.41990 | 7.13700 | 1.49700 | 81.6 |
| 4 | −898.58100 | 0.15000 | | |
| 5 | 47.99770 | 4.29620 | 1.59282 | 68.6 |
| 6 | 152.93390 | Variable | | |
| 7* | 85.13440 | 0.70000 | 1.80500 | 41.0 |
| 8* | 14.12710 | 6.77380 | | |
| 9 | −24.47630 | 0.65000 | 1.77250 | 49.6 |
| 10 | 12.40270 | 0.01000 | 1.56732 | 42.8 |
| 11 | 12.40270 | 4.74680 | 1.92286 | 20.9 |
| 12 | −38.13480 | 1.15510 | | |
| 13 | −19.33380 | 0.55000 | 1.84666 | 23.8 |
| 14 | −984.62630 | Variable | | |
| 15(Diaphragm) | ∞ | 1.00000 | | |
| 16* | 14.62830 | 2.99610 | 1.58332 | 59.1 |
| 17* | −322.73360 | 1.40340 | | |
| 18 | 16.14620 | 3.95370 | 1.48749 | 70.4 |
| 19 | −13.25720 | 0.01000 | 1.56732 | 42.8 |
| 20 | −13.25720 | 0.80000 | 1.64769 | 33.8 |
| 21 | 14.76440 | 2.90000 | | |
| 22* | 13.37660 | 3.47200 | 1.51776 | 69.9 |
| 23* | −25.00000 | Variable | | |
| 24 | 60.10550 | 0.50000 | 1.49700 | 81.6 |
| 25 | 14.89760 | Variable | | |
| 26* | 13.81940 | 2.84390 | 1.54410 | 56.1 |
| 27* | −12.45050 | Variable | | |
| 28* | −10.86940 | 1.09000 | 1.54410 | 56.1 |
| 29 | 21.44620 | 1.00000 | | |
| 30 | ∞ | 0.78000 | 1.51680 | 64.2 |
| 31 | ∞ | (BF) | | |
| Image surface | ∞ | | | |

TABLE 14

(Aspherical data)

Surface No. 7

K = 0.00000E+00, A4 = 8.47580E−06, A6 = 5.61846E−07,
A8 = −3.06412E−09 A10 = 2.35805E−12, A12 = 8.30852E−15,
A14 = 0.00000E+00

Surface No. 8

K = 0.00000E+00, A4 = 1.74688E−05, A6 = 5.63030E−07,
A8 = 5.61040E−09 A10 = 8.64032E−11, A12 = −4.52816E−13,
A14 = 0.00000E+00

Surface No. 16

K = 0.00000E+00, A4 = 2.33571E−06, A6 = −1.48478E−06,
A8 = 1.19322E−07 A10 = −3.40533E−09, A12 = 4.20870E−11,
A14 = −1.53813E−16

Surface No. 17

K = 0.00000E+00, A4 = 2.35366E−05, A6 = −3.04971E−06,
A8 = 2.18616E−07 A10 = −6.21530E−09, A12 = 7.24108E−11,
A14 = −5.87135E−16

Surface No. 22

K = 0.00000E+00, A4 = −1.10358E−04, A6 = −8.98389E−07,
A8 = 5.50286E−08 A10 = −1.33718E−09, A12 = 0.00000E+00,
A14 = 0.00000E+00

Surface No. 23

K = 0.00000E+00, A4 = 4.71055E−05, A6 = −5.88116E−07,
A8 = 4.21873E−08 A10 = −1.17312E−09, A12 = 0.00000E+00,
A14 = 0.00000E+00

Surface No. 26

K = 0.00000E+00, A4 = −2.09805E−04, A6 = 1.51149E−06,
A8 = −1.97232E−07 A10 = 1.13403E−08, A12 = 0.00000E+00,
A14 = 0.00000E+00

Surface No. 27

K = 0.00000E+00, A4 = 2.48914E−04, A6 = 5.18792E−06,
A8 = −1.59195E−07 A10 = 1.22784E−08, A12 = 0.00000E+00,
A14 = 0.00000E+00

Surface No. 28

K = 0.00000E+00, A4 = 1.19282E−03, A6 = −1.09455E−05,
A8 = 6.11459E−07 A10 = −9.59011E−09, A12 = 0.00000E+00,
A14 = 0.00000E+00

TABLE 15

(Various data)

Zooming ratio 22.22177

| | Wide-angle limit | Middle position | Telephoto limit |
|---|---|---|---|
| Focal length | 4.6397 | 21.8708 | 103.1029 |
| F-number | 2.49990 | 2.49995 | 2.50039 |
| Half view angle | 40.8521 | 10.3296 | 2.1710 |
| Image height | 3.4100 | 3.9020 | 3.9020 |
| Overall length of lens system | 98.4695 | 104.2279 | 125.7405 |
| BF | 0.85582 | 0.86438 | 0.84510 |
| d6 | 0.5000 | 28.8939 | 50.1417 |
| d14 | 37.8099 | 8.0590 | 0.5000 |
| d23 | 1.5028 | 12.5243 | 3.5569 |
| d25 | 5.9784 | 1.9974 | 18.9512 |
| d27 | 1.4946 | 1.5609 | 1.4176 |
| Entrance pupil position | 26.2653 | 106.5446 | 369.2967 |
| Exit pupil position | −27.6839 | −27.2556 | −62.1438 |
| Front principal points position | 30.1508 | 111.4050 | 303.6364 |
| Back principal points position | 93.8298 | 82.3571 | 22.6376 |

Single lens data

| Lens element | Initial surface number | Focal length |
|---|---|---|
| 1 | 1 | −193.9699 |
| 2 | 3 | 101.7071 |
| 3 | 5 | 116.2274 |
| 4 | 7 | −21.1336 |
| 5 | 9 | −10.5745 |
| 6 | 11 | 10.6199 |
| 7 | 13 | −23.2987 |
| 8 | 16 | 24.0690 |
| 9 | 18 | 15.6218 |
| 10 | 20 | −10.6650 |
| 11 | 22 | 17.3662 |
| 12 | 24 | −40.0000 |
| 13 | 26 | 12.5150 |
| 14 | 28 | −13.1019 |

Zoom lens unit data

| Lens unit | Initial surface No. | Focal length | Overall length of lens unit | Front principal points position | Back principal points position |
|---|---|---|---|---|---|
| 1 | 1 | 76.79698 | 12.99320 | 2.82005 | 7.38914 |
| 2 | 7 | −9.72035 | 14.58570 | 3.90761 | 8.74199 |
| 3 | 15 | 16.16441 | 16.53520 | 7.19737 | 7.61315 |
| 4 | 24 | −39.99998 | 0.50000 | 0.44570 | 0.61047 |
| 5 | 26 | 12.51498 | 2.84390 | 1.00730 | 1.93638 |
| 6 | 28 | −13.10188 | 2.87000 | 0.23465 | 0.89278 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.17034 | −0.33903 | −1.30944 |
| 3 | 15 | −0.35092 | −0.90045 | −0.81534 |
| 4 | 24 | 1.37771 | 1.28319 | 1.69631 |
| 5 | 26 | 0.60319 | 0.59743 | 0.60992 |
| 6 | 28 | 1.21623 | 1.21688 | 1.21541 |

The following Table 16 shows the corresponding values to the individual conditions in the zoom lens systems of each of Numerical Examples.

TABLE 16

(Values corresponding to conditions)

| | | Numerical Example | | | | |
|---|---|---|---|---|---|---|
| Condition | | 1 | 2 | 3 | 4 | 5 |
| (1) | $D_4/f_T$ | 0.11 | 0.06 | 0.19 | 0.16 | 0.13 |
| (2) | $L_T/f_T$ | 1.21 | 1.19 | 1.24 | 1.02 | 1.22 |
| (3) | $f_T/f_W$ | 22.2 | 22.2 | 22.2 | 28.0 | 22.2 |
| (4) | $F_T/F_W$ | 1.0 | 1.0 | 1.0 | 1.0 | 1.0 |

The present disclosure is applicable to a digital input device, such as a digital camera, a camera for a mobile terminal device such as a smart-phone, a surveillance camera in a surveillance system, a Web camera or a vehicle-mounted camera. In particular, the present disclosure is applicable to a photographing optical system where high image quality is required like in a digital camera.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system, in order from an object side to an image side, comprising:
a first lens unit having positive optical power;
a second lens unit having negative optical power;
a third lens unit having positive optical power;
a fourth lens unit having negative optical power;
a fifth lens unit; and
a sixth lens unit, wherein
in zooming from a wide-angle limit to a telephoto limit at a time of image taking, the first lens unit, the second lens unit, the third lens unit, and the fourth lens unit move along an optical axis so that an interval between the third lens unit and the fourth lens unit at the telephoto limit is larger than that at the wide-angle limit, wherein
focusing from an infinity in-focus condition to a close-object in-focus condition is performed by moving the fourth lens unit along the optical axis, and wherein
the following conditions (3) and (4) are satisfied:

$$f_T/f_W > 12.0 \tag{3}$$

$$F_T/F_W < 1.4 \tag{4}$$

where
$f_T$ is a focal length of the zoom lens system at the telephoto limit,
$f_W$ is a focal length of the zoom lens system at the wide-angle limit,
$F_T$ is an F-number at the telephoto limit, and
$F_W$ is an F-number at the wide-angle limit.

2. The zoom lens system as claimed in claim 1, wherein the following condition (1) is satisfied:

$$0.05 < D_4/f_T < 0.20 \quad (1)$$

where $D_4$ is an amount of movement of the fourth lens unit from the wide-angle limit in zooming from the wide-angle limit to the telephoto limit at the time of image taking, and $f_T$ is a focal length of the zoom lens system at the telephoto limit.

3. The zoom lens system as claimed in claim 1, wherein the fifth lens unit has positive optical power.

4. The zoom lens system as claimed in claim 1, wherein the sixth lens unit has negative optical power.

5. The zoom lens system as claimed in claim 1, wherein the fifth lens unit is composed of one lens element.

6. The zoom lens system as claimed in claim 1, wherein the sixth lens unit is composed of one lens element.

7. The zoom lens system as claimed in claim 1, wherein an aperture diaphragm is placed between the second lens unit and the third lens unit, and wherein in zooming from the wide-angle limit to the telephoto limit at the time of image taking, the aperture diaphragm moves along the optical axis and the maximum diameter of the aperture diaphragm at the telephoto limit becomes larger than the maximum diameter of the aperture diaphragm at the wide-angle limit.

8. The zoom lens system as claimed in claim 7, wherein the aperture diaphragm is placed on the object side relative to the third lens unit, and the aperture diaphragm moves together with the third lens unit along the optical axis in zooming from the wide-angle limit to the telephoto limit at the time of image taking.

9. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is a zoom lens system as claimed in claim 1.

10. A camera for converting an optical image of an object into an electric image signal and then performing at least one of displaying and storing of the converted image signal, comprising:
an imaging device including a zoom lens system that forms the optical image of the object, and an image sensor that converts the optical image formed by the zoom lens system into the electric image signal, wherein
the zoom lens system is a zoom lens system as claimed in claim 1.

11. A zoom lens system, in order from an object side to an image side, comprising:
at least
a first lens unit having positive optical power;
a second lens unit having negative optical power; and
a third lens unit having positive optical power, wherein
in zooming from a wide-angle limit to a telephoto limit at a time of image taking, the first lens unit, the second lens unit, and the third lens unit move along an optical axis, and wherein the following conditions (2), (3) and (5) are satisfied:

$$0.7 < L_T/f_T < 1.5 \quad (2)$$

$$f_T/f_W > 12.0 \quad (3)$$

$$F_T < 4.060882 \quad (5)$$

where $L_T$ is an overall length of the zoom lens system at the telephoto limit, being a distance from a most object side surface of the first lens unit to an image surface, $f_T$ is a focal length of the zoom lens system at the telephoto limit, $f_W$ is a focal length of the zoom lens system at the wide-angle limit, $F_T$ is an F-number at the telephoto limit.

12. The zoom lens system as claimed in claim 11, wherein, on the image side relative to the third lens unit, a fourth lens unit having negative optical power, a fifth lens unit having positive optical power, and a sixth lens unit having negative optical power are placed in order from the object side to the image side.

13. The zoom lens system as claimed in claim 11, wherein
an aperture diaphragm is placed between the second lens unit and the third lens unit, and wherein in zooming from the wide-angle limit to the telephoto limit at the time of image taking, the aperture diaphragm moves together with the third lens unit along the optical axis and the maximum diameter of the aperture diaphragm at the telephoto limit becomes larger than the maximum diameter of the aperture diaphragm at the wide-angle limit.

14. The zoom lens system as claimed in claim 13, wherein the aperture diaphragm is placed on the object side relative to the third lens unit, and the aperture diaphragm moves together with the third lens unit along the optical axis in zooming from the wide-angle limit to the telephoto limit at the time of image taking.

15. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is a zoom lens system as claimed in claim 11.

16. A camera for converting an optical image of an object into an electric image signal and then performing at least one of displaying and storing of the converted image signal, comprising:
an imaging device including a zoom lens system that forms the optical image of the object, and an image sensor that converts the optical image formed by the zoom lens system into the electric image signal, wherein
the zoom lens system is a zoom lens system as claimed in claim 11.

* * * * *